(12) United States Patent
Sato et al.

(10) Patent No.: US 8,078,584 B2
(45) Date of Patent: Dec. 13, 2011

(54) DOCUMENT RETRIEVING SYSTEM, DOCUMENT RETRIEVING APPARATUS, METHOD, PROGRAM AND STORAGE MEDIUM THEREFOR

(75) Inventors: Masaaki Sato, Yokohama (JP); Shin Fukuda, Tokyo (JP)

(73) Assignee: Canon Kabushiki Kaisha (JP)

( * ) Notice: Subject to any disclaimer, the term of this patent is extended or adjusted under 35 U.S.C. 154(b) by 236 days.

(21) Appl. No.: 11/682,393

(22) Filed: Mar. 6, 2007

(65) Prior Publication Data
US 2007/0219965 A1    Sep. 20, 2007

(30) Foreign Application Priority Data

Mar. 14, 2006 (JP) ................................. 2006-069902
Feb. 13, 2007 (JP) ................................. 2007-032681

(51) Int. Cl.
*G06F 17/30* (2006.01)
(52) U.S. Cl. ...................................................... 707/672
(58) Field of Classification Search .................. 707/672, 707/665, 668, 673
See application file for complete search history.

(56) References Cited

U.S. PATENT DOCUMENTS

| | | | | |
|---|---|---|---|---|
| 6,466,931 | B1 * | 10/2002 | Attaluri et al. .................... | 707/2 |
| 7,181,438 | B1 * | 2/2007 | Szabo ................................. | 1/1 |
| 2001/0044758 | A1 * | 11/2001 | Talib et al. ....................... | 705/27 |
| 2005/0154710 | A1 * | 7/2005 | Ruhlow et al. .................... | 707/3 |
| 2006/0069672 | A1 * | 3/2006 | Maloney et al. .................. | 707/3 |

FOREIGN PATENT DOCUMENTS

JP        2004-342042 A    12/2004

* cited by examiner

*Primary Examiner* — Charles Kim
*Assistant Examiner* — Fatima Mina
(74) *Attorney, Agent, or Firm* — Rossi, Kimms & McDowell LLP

(57) ABSTRACT

Each of two or more document management server stores a document and index data corresponding to the document. Of the index data stored in the two or more document management servers, index data corresponding to a document that satisfies a first retrieval condition is collected for storage. When a user requests retrieval based on a second retrieval condition, it is determined whether the first retrieval condition and the second retrieval condition are the same, and when the first and second conditions are the same, the document retrieval according to the user's instruction is performed by referring to the collected index data.

14 Claims, 30 Drawing Sheets

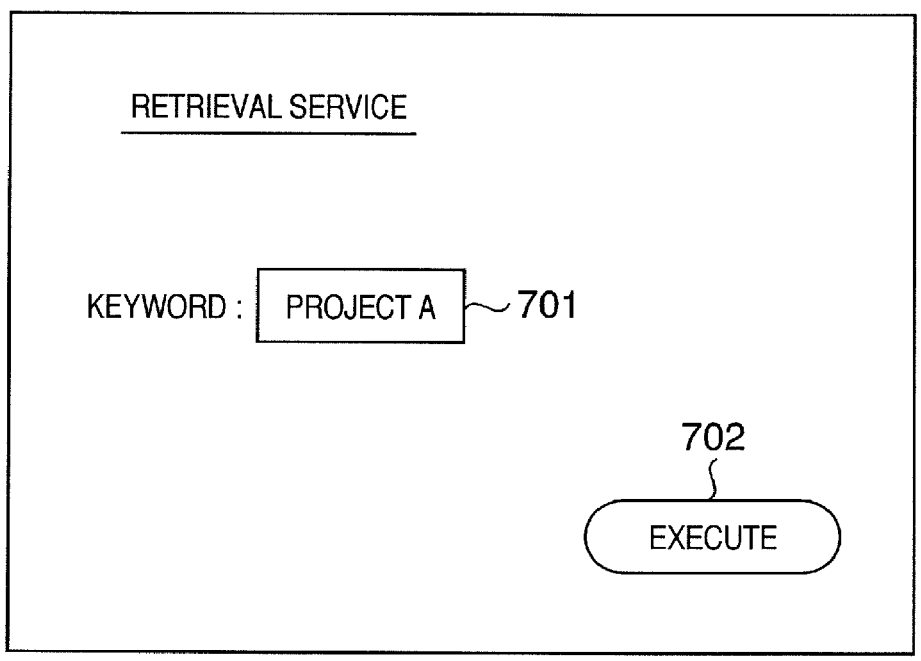
F I G. 7

FIG. 8

| KEYWORD | NUMBER OF USES | SERVER | NUMBER OF DOCUMENTS | REGISTRATION DATE | UPDATE DATE |
|---|---|---|---|---|---|
| PROJECT A | 10 | SERVER 105 | 1500 | 2005/11/3 | 2005/11/5 |
|  | 10 | SERVER 106 | 1000 | 2005/11/3 | 2005/11/5 |
|  | 10 | SERVER 107 | 500 | 2005/11/3 | 2005/11/5 |
| TOKYO | 10 | SERVER 105 | 1500 | 2005/10/3 | 2005/10/30 |
|  | 10 | SERVER 106 | 100 | 2005/10/3 | 2005/10/30 |
|  | 10 | SERVER 107 | 500 | 2005/10/3 | 2005/10/30 |
| CAMERA | 10 | SERVER 105 | 1500 | 2004/11/3 | 2004/11/5 |
|  | 10 | SERVER 106 | 500 | 2004/11/3 | 2004/11/5 |
|  | 10 | SERVER 107 | 100 | 2004/11/3 | 2004/11/5 |

FIG. 9A

| KEYWORD | SERVER | DOCUMENT NAME, STORAGE DESTINATION |
|---|---|---|
| PROJECT A | SERVER 105 | DOCUMENT 1 (STORAGE DESTINATION) |
| | | DOCUMENT 2 (STORAGE DESTINATION) |
| | SERVER 106 | DOCUMENT 3 (STORAGE DESTINATION) |
| | | DOCUMENT 4 (STORAGE DESTINATION) |
| | | DOCUMENT 5 (STORAGE DESTINATION) |
| | | DOCUMENT 6 (STORAGE DESTINATION) |
| | SERVER 107 | DOCUMENT 7 (STORAGE DESTINATION) |
| | | DOCUMENT 8 (STORAGE DESTINATION) |
| | | DOCUMENT 9 (STORAGE DESTINATION) |

FIG. 9B

| KEYWORD | SERVER | INDEX |
|---|---|---|
| PROJECT A | SERVER 106 | DOCUMENTS 1, 2 (SERVER 105), DOCUMENTS 3 TO 6 (SERVER 106), DOCUMENTS 7 TO 9 (SERVER 107) |

FIG. 10

RETRIEVAL RESULT DISPLAY        KEYWORD (PROJECT A)

| DOCUMENT NAME | SERVER NAME | SIZE | UPDATE DATE |
|---|---|---|---|
| AAAA | SEVER 106 | 10 | 2005/11/12 |
| BBBB | SEVER 106 | 20 | 2005/11/13 |
| CCCC | SEVER 105 | 10 | 2005/11/14 |

FIG. 11

| KEYWORD | COLLECTION DESTINATION |
|---|---|
| PROJECT A | SERVER 106 |
| TOKYO | SERVER 106 |
| CAMERA | SERVER 107 |

FIG. 15

| RETRIEVAL KEYWORD | NUMBER OF RETRIEVALS |
|---|---|
| ORANGE | 4 |
| APPLE | 3 |
| BANANA | 8 |
| PERSIMMON | 10 |
| ABALONE | 3 |
| TUNA | 27 |

⋮  ⋮

F I G. 16

| INDEX NAME | RETRIEVAL KEYWORD | DOCUMENT NAME | DOCUMENT LOCATION:<br>DOCUMENT SERVER NAME / FILE PATH |
|---|---|---|---|
| INDEX A | ORANGE, APPLE, BANANA | DOCUMENT A | DOCUMENT SERVER 1201<br>/ DOC / DocA |
| INDEX B | AIRPLANE, TRAIN, AUTOMOBILE | DOCUMENT B | DOCUMENT SERVER 1201<br>/ DOC / DocB |
| INDEX C | EGG, LAVER, ORANGE | DOCUMENT C | DOCUMENT SERVER 1203<br>/ DOC / DocC |
| INDEX D | BIRD, MONKEY, PHEASANT | DOCUMENT D | DOCUMENT SERVER 1204<br>/ DOC / DocD |
| ... | ... | ... | ... |

FIG. 17

| RETRIEVAL KEYWORD | DOCUMENT SERVER TO SEND RETRIEVAL RESULTS |
|---|---|
| ORANGE, APPLE, BANANA | DOCUMENT SERVER 1201 |

FIG. 18

| RETRIEVAL RESULT DISPLAY | |
|---|---|
| KEYWORD : ORANGE | |

| DOCUMENT NAME | DOCUMENT SERVER |
|---|---|
| DOCUMENT NAME A | DOCUMENT SERVER 1201 |
| DOCUMENT NAME C | DOCUMENT SERVER 1203 |
| DOCUMENT NAME F | DOCUMENT SERVER 1202 |
| DOCUMENT NAME J | DOCUMENT SERVER 1203 |
| DOCUMENT NAME L | DOCUMENT SERVER 1204 |
| DOCUMENT NAME S | DOCUMENT SERVER 1204 |

1801 — row 1
1802 — rows 2–6

F I G. 21

COLLECTING CONDITION

| KEYWORD | COLLECTION DESTINATION DOCUMENT SERVER |
|---------|----------------------------------------|
| ORANGE  | DOCUMENT SERVER 1201                   |

F I G. 24
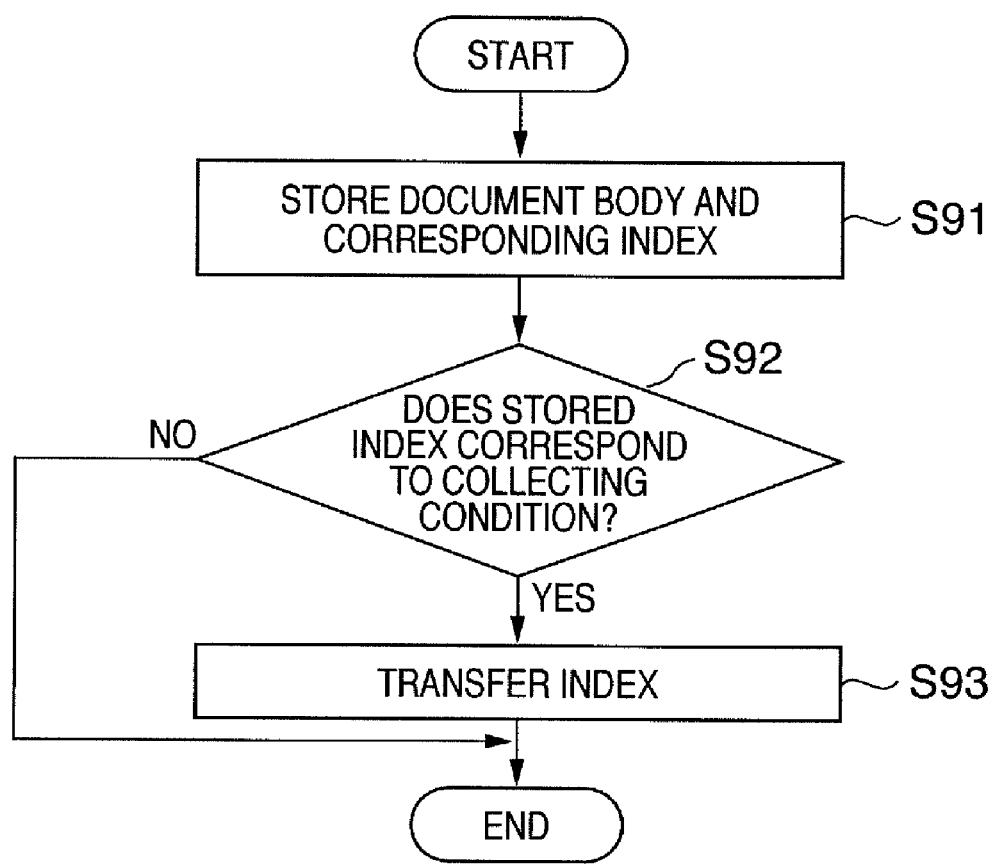

F I G. 25A

| INDEX NAME | RETRIEVAL KEYWORD | DOCUMENT NAME | DOCUMENT LOCATION : DOCUMENT SERVER NAME / FILE PATH |
|---|---|---|---|
| INDEX Q | PANDA, ELEPHANT | DOCUMENT Q | DOCUMENT SERVER 1201 / DOC / DocQ |

FIG. 25B

COLLECTING CONDITIONS

| KEYWORD | COLLECTION DESTINATION DOCUMENT SERVER |
|---|---|
| ORANGE | DOCUMENT SERVER 1201 |
| GIRAFFE | DOCUMENT SERVER 1202 |
| APPLE | DOCUMENT SERVER 1201 |
| ELEPHANT | DOCUMENT SERVER 1203 |
| BANANA | DOCUMENT SERVER 1201 |
| PANDA | DOCUMENT SERVER 1204 |

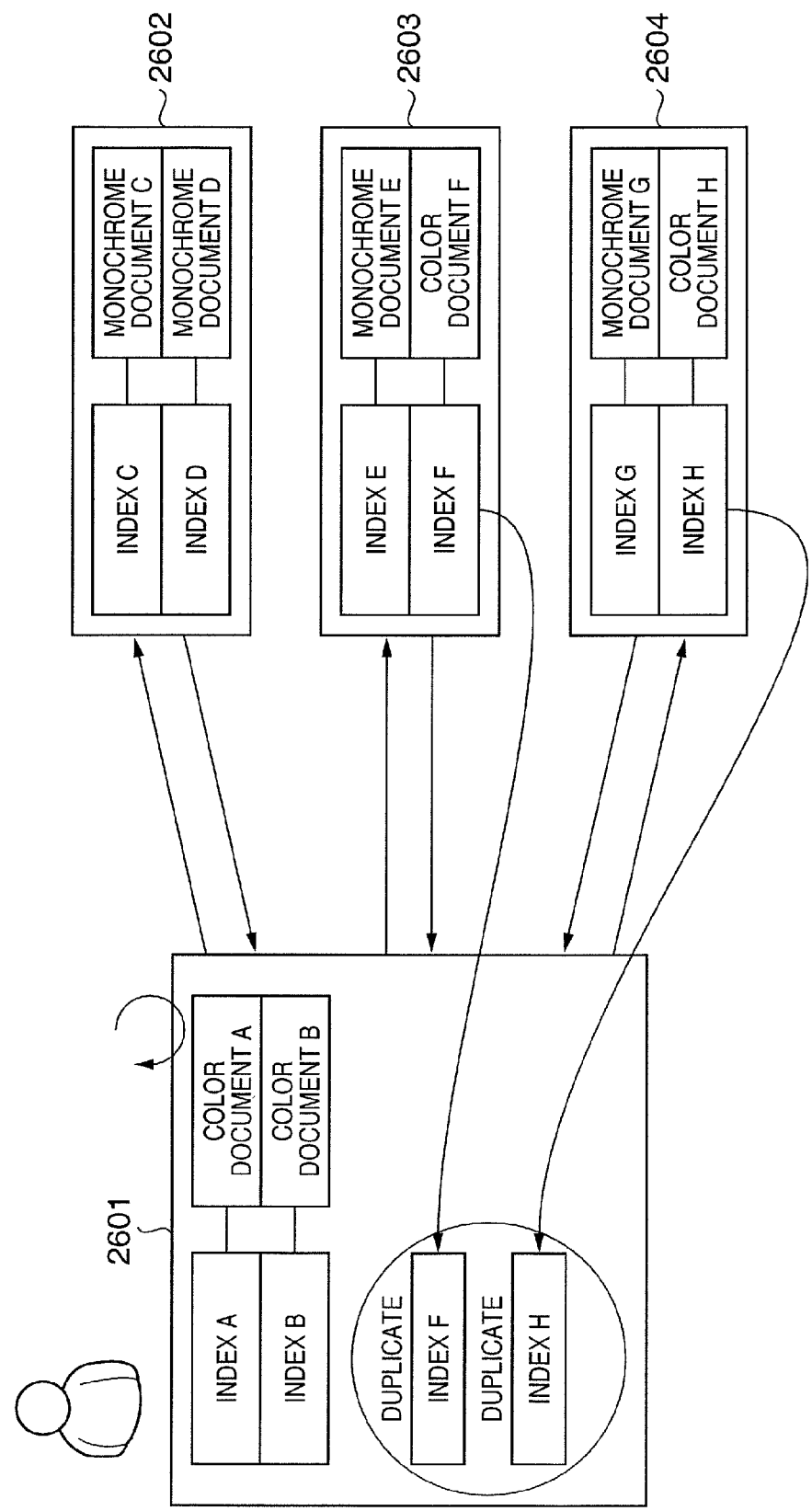

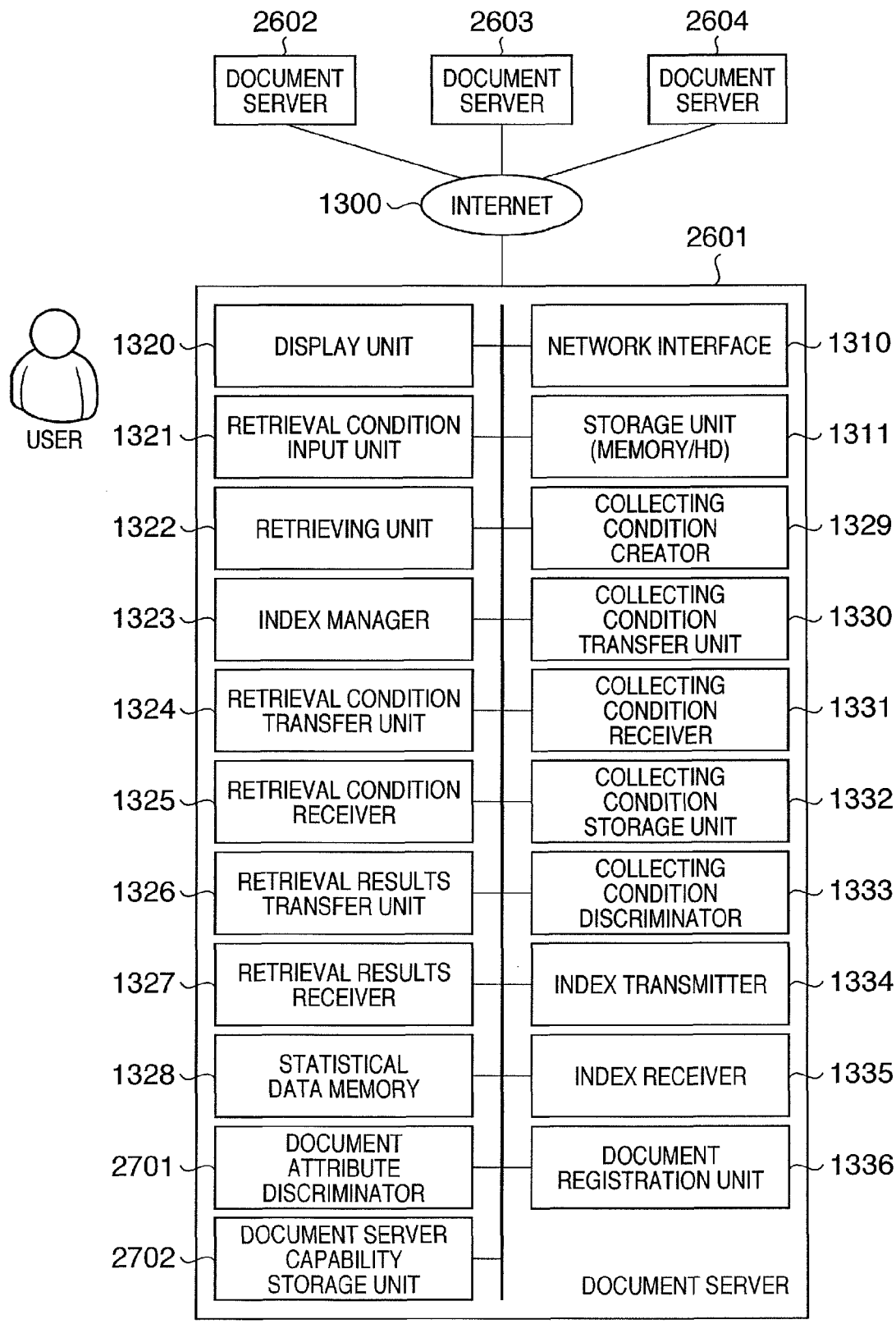

FIG. 29A

| DOCUMENT NAME | COLOR TYPE | IMAGE SIZE |
|---|---|---|
| DOCUMENT R | COLOR | 1024 × 768 |

FIG. 29B

| DOCUMENT SERVER | DISPLAY COLOR TYPE | DISPLAYABLE SIZE |
|---|---|---|
| DOCUMENT SERVER 2601 | COLOR | 800 × 600 |
| DOCUMENT SERVER 2602 | MONOCHROME | 1024 × 768 |
| DOCUMENT SERVER 2603 | COLOR | 1600 × 1200 |
| DOCUMENT SERVER 2604 | COLOR | 600 × 480 |

DOCUMENT RETRIEVING SYSTEM, DOCUMENT RETRIEVING APPARATUS, METHOD, PROGRAM AND STORAGE MEDIUM THEREFOR

BACKGROUND OF THE INVENTION

1. Field of the Invention

The present invention relates to a document retrieving system and a document retrieving apparatus for retrieving a document from documents registered in two or more document management servers which are connected via a network, and method, program and a storage media therefor.

2. Description of the Related Art

A document retrieving system is known in which two or more documents are stored in a database such as a document server, and a user retrieves a desired document from the stored documents. In such a system, when a document is registered for example, keywords contained in the document data are extracted to produce an index. The index produced in this manner is managed separately from the document in association with that document.

When a user inputs a keyword for retrieving a document, it is determined if the input keyword is included in the indices. If an index includes the keyword, the document corresponding to that index is determined as the document to be retrieved. Using the index in this manner improves the response time during retrieval.

As such a document retrieving system, implementation of an integrated document retrieval service is proposed by an apparatus that the user operates (personal computer (PC), for example) requesting two or more servers for retrieval (see Japanese Patent Laid-Open No. 2004-342042). In such a system, two or more servers share the indices of the documents stored in the respective servers. Accordingly, by the user issuing a document retrieval order to any one of the servers, it is possible to perform retrieval from the documents stored in two or more servers.

However, the above-described conventional technique has the following problems. That is, upon retrieving a document from documents stored in two or more servers or the like that are connected via a network, if a retrieval request is made to all the servers, it may take time before receiving retrieval results from all the servers. In addition, since a large volume of data containing information on the retrieval request or retrieval results is sent to the network for each retrieval operation, the network will be under heavy load.

Alternatively, if two or more servers share the indices of the documents stored in the respective servers, as disclosed in Japanese Patent Laid-Open No. 2004-342042 described above, it is sufficient to make a retrieval request to one of the servers upon retrieval, which improves the retrieval efficiency.

However, in such a case, two or more servers are respectively required to maintain the indices of the documents registered in all the other servers. Therefore, as the number of servers or stored documents increases, the data volume of the indices to be maintained increases, which invites a waste of memory resources and extends the time required for retrieval. Also, in a case that a document is registered in a certain server, the index thereof is transferred to all the other servers via a network, which increases network traffic.

SUMMARY OF THE INVENTION

The object of the present invention is to solve the above-described problems of the conventional technique.

The present invention is characterized in improving the retrieval efficiency upon retrieving a document from documents registered in two or more document management servers which are connected via a network.

According to an aspect of the present invention, there is provided a document retrieving system for retrieving a document from documents registered in two or more document management servers which are connected via a network, the document retrieving system comprising:

a storing unit, provided with each of the document management servers, configured to store a document and index data corresponding to the document;

a collection unit configured to collect the index data corresponding to a document satisfying a first retrieval condition from the index data stored in the storing unit of each of the document management servers;

a determination unit configured to determine whether a second retrieval condition is the same as the first retrieval condition, the second retrieval condition being designated by a user; and a retrieving unit configured to retrieve the document by referring to the index data collected by the collection unit, in a case where the determination unit determines that the second retrieval condition is the same as the first retrieval condition.

According to an aspect of the present invention, there is provided a document retrieving apparatus for retrieving a document from documents registered in two or more document management servers which are connected to the document retrieving apparatus via a network, the document retrieving apparatus comprising:

an input unit configured to receive a retrieval condition to retrieve a document;

a log information management unit configured to manage log information of the retrieval condition received by the input unit;

a determination unit configured to determine whether a retrieval condition satisfying a predetermined collecting condition exists based on the log information managed by the log information management unit; and a collection unit configured to collect, in a case where the determination unit determines that the retrieval condition satisfying the predetermined collecting condition exists, index data corresponding to the document satisfying the retrieval condition in the document retrieving apparatus.

Further, according to an aspect of the present invention, there is provided a document retrieving method for retrieving a document from documents registered in two or more document management servers which are connected via a network, the method comprising the steps of:

storing a document and index data corresponding to the document in a storing unit of each of the document management servers, collecting index data corresponding to a document satisfying a first retrieval condition from the index data stored in the storing unit in the storing step, determining whether a second retrieval condition is the same as the first retrieval condition, the second retrieval condition being designated by a user, and performing retrieval by referring to the index data collected in the collecting step, in a case where it is determined in the determining step that the second retrieval condition is the same as the first retrieval condition.

According to an aspect of the present invention, there is provided a document retrieving method for a document retrieving apparatus for retrieving a document from documents registered in two or more document management servers which are connected to the document retrieving apparatus via a network, the method comprising the steps of:

inputting a retrieval condition to retrieve a document, managing log information of the retrieval condition input in the inputting step, determining whether a retrieval condition satisfying a predetermined collecting condition exists, based on the log information managed in the log information management step, and collecting, in a case where it is determined in the determination step that the retrieval condition satisfying the predetermined collecting condition exists, index data corresponding to the document satisfying the retrieval condition in the document retrieving apparatus.

Further features of the present invention will be apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 7 is a diagram illustrating an exemplary keyword input window of a personal computer (PC) according to the embodiment of the present invention.

FIG. 8 is a diagram showing an exemplary hit table stored in a hit data memory according to the embodiment of the present invention.

FIGS. 9A and 9B are diagrams showing an exemplary collected index table that stores collected indices according to the embodiment of the present invention.

FIG. 10 is a diagram illustrating an exemplary window to display document retrieval results on a PC according to an embodiment of the present invention.

FIG. 11 is an exemplary diagram of a table for managing keywords for which corresponding indices are collected according to the embodiment of the present invention.

FIG. 15 is a diagram showing an exemplary retrieval statistical data table according to the embodiment of the present invention.

FIG. 16 is a diagram showing an exemplary index table managed by the document server according to the embodiment of the present invention.

FIG. 17 is a diagram showing an exemplary retrieval condition transmitted to the document server according to the embodiment of the present invention.

FIG. 18 is a diagram showing an exemplary retrieval result display window of the document server according to the embodiment of the present invention.

FIG. 21 is a diagram showing an exemplary collecting condition transmitted to the document server according to the embodiment of the present invention.

FIG. 24 is a flowchart describing a process to register a new document on the document server according to the embodiment of the present invention.

FIGS. 25A and 25B are diagrams describing a document registration process on the document server according to the embodiment of the present invention.

FIG. 26 is a diagram illustrating characteristics of a configuration of the document retrieving system according to the embodiment of the present invention.

FIG. 27 is a block diagram illustrating a configuration of the document retrieving system according to the embodiment of the present invention.

FIGS. 29A and 29B are diagrams describing document attributes and capability information of the document server according to the embodiment of the present invention.

DESCRIPTION OF THE EMBODIMENTS

Preferred embodiments of the present invention will now be described in detail with reference to the drawings. It should be noted that these embodiments do not limit the scope of the present invention, and all combinations of the characteristics described in the embodiments are not necessarily essential to the implementation of the present invention.

Embodiment 1

Figure 1A:
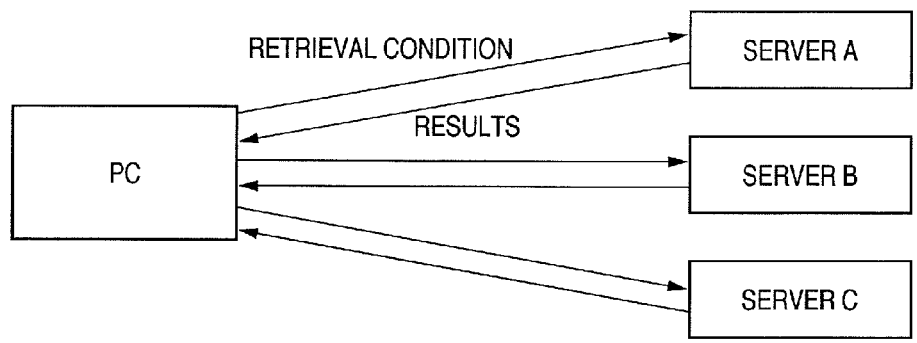
FIGS. 1A and 1B are diagrams describing characteristics of a configuration of a document retrieving system according to an embodiment of the present invention.
Figure 1B:
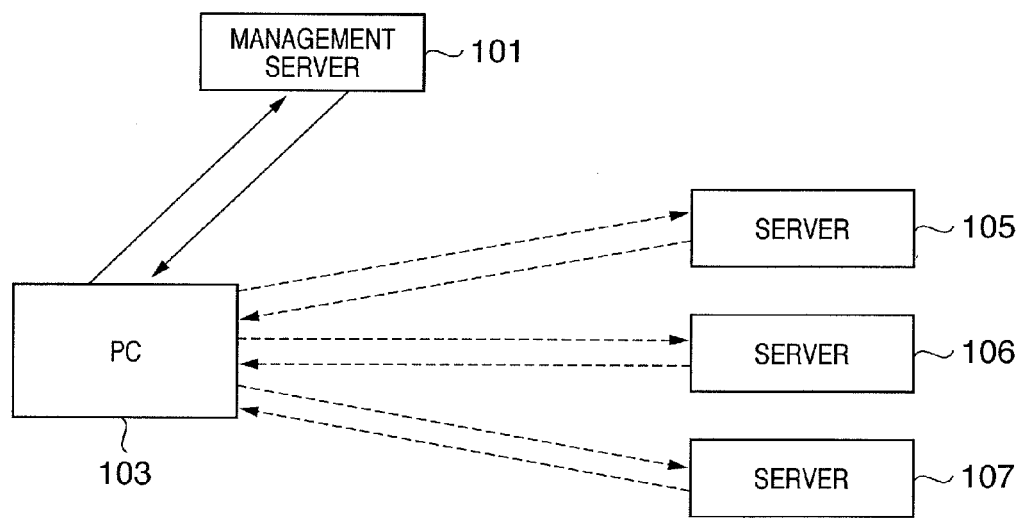

FIGS. 1A and 1B are diagrams describing characteristics of a configuration of a document retrieving system according to a first embodiment of the present invention.

FIG. 1A is a block diagram describing a configuration of a conventional document retrieving system (multi-server retrieving system) Here, a user operates a PC to transmit a retrieval condition (keyword) to each server in order to make a retrieval request. Each server stores a document and the index associated with that document. When each server receives a retrieval request from the PC, it compares the retrieval condition received from the PC with the indices stored therein, and notifies the PC of the retrieval results. The PC merges the retrieval results notified by the servers to display the merged results to the user.

If the number of servers to which the PC makes a retrieval request is large, it may take time to perform retrieval. Especially in a case where the PC waits for receiving retrieval results from all the servers and merges the retrieval results for display, the retrieval results are not output for display until the PC receives the retrieval results from all the servers. This deteriorates the retrieval efficiency.

On the other hand, FIG. 1B is a block diagram describing a configuration of a document retrieving system (multi-server retrieving system) according to the first embodiment. Here, the user first transmits a retrieval condition (keyword) to a management server 101 using a PC 103, and at the same time transmits the retrieval condition to servers 105 to 107 to request document retrieval. The management server 101 determines whether the retrieval condition input by the user is the retrieval condition subject to index collection, based on a predetermined collecting condition (for example, the retrieval condition has been used at least a predetermined number of times during a predetermined period).

When it is determined that the retrieval condition is subject to index collection, the indices corresponding to the retrieval condition are collected in a certain server. In this collecting operation, the index stored in the servers 105 to 107 may be transferred to a certain server. Alternatively, the index may be duplicated to be stored in a certain collection destination server, with the index left on the original server. Furthermore, the management server 101 manages information indicating the retrieval condition for which the corresponding indices have been collected, along with information indicating that such collection of the corresponding indices has been performed.

After that, in a case that the user designates a certain retrieval condition and gives the instruction to perform retrieval, the management server 101 determines whether it manages the designated retrieval condition. Here, if the management server 101 manages the retrieval condition designated by the user, it means that the indices corresponding thereto have already been collected. Therefore, the management server 101 identifies the server in which the indices are collected, and notifies the server of the retrieval condition so as to request retrieval.

One of the servers 105 to 107 or the management server 101 may be a server in which the indices are collected. In the first embodiment, a case is described in which the indices are collected in one of the servers 105 to 107 that stores the most documents corresponding to the collected indices (in FIG. 1, one of the servers 105 to 107).

In such a case, when a certain keyword is designated as the retrieval condition at least a predetermined number of times, the server that stores the most documents that are retrieved by the keyword is identified. Then, the indices of the documents retrieved by the keyword are collected in that server (server 106 for example). Accordingly, when retrieval is instructed with that keyword at any subsequent occasion, it is possible to perform retrieval from the documents stored in the other servers 105 and 107 by requesting the server 106, in which the indices are collected, to perform retrieval. Therefore, the retrieval efficiency improves.

In this case, it is required to manage a keyword for which the corresponding indices are collected and a server in which such indices are collected. For this reason, in the first embodiment, for each keyword designated as the retrieval condition, the management server 101 stores information indicating the server in which the indices corresponding to each keyword are collected, in the format of a table as shown in FIG. 11 for example. In FIG. 11, the index collection tables for the keywords shown in FIG. 11 are stored in the servers 105, 106 and 107, respectively.

Although the management server 101 is shown as a separate server from the servers 105 to 107 in the present embodiment, the management server 101 may be incorporated in any of the servers 105 to 107. Alternatively, the management server 101 may be incorporated in the PC 103.

Also, the index is produced for each document on each server, and contains information indicating character strings contained in the document, document name, document preparation date and time, user who prepared the document or the like. The keyword designated as the retrieval condition represents the index of a document itself, or a character string contained in the index of a document, which the user inputs to perform retrieval.

Figure 2:
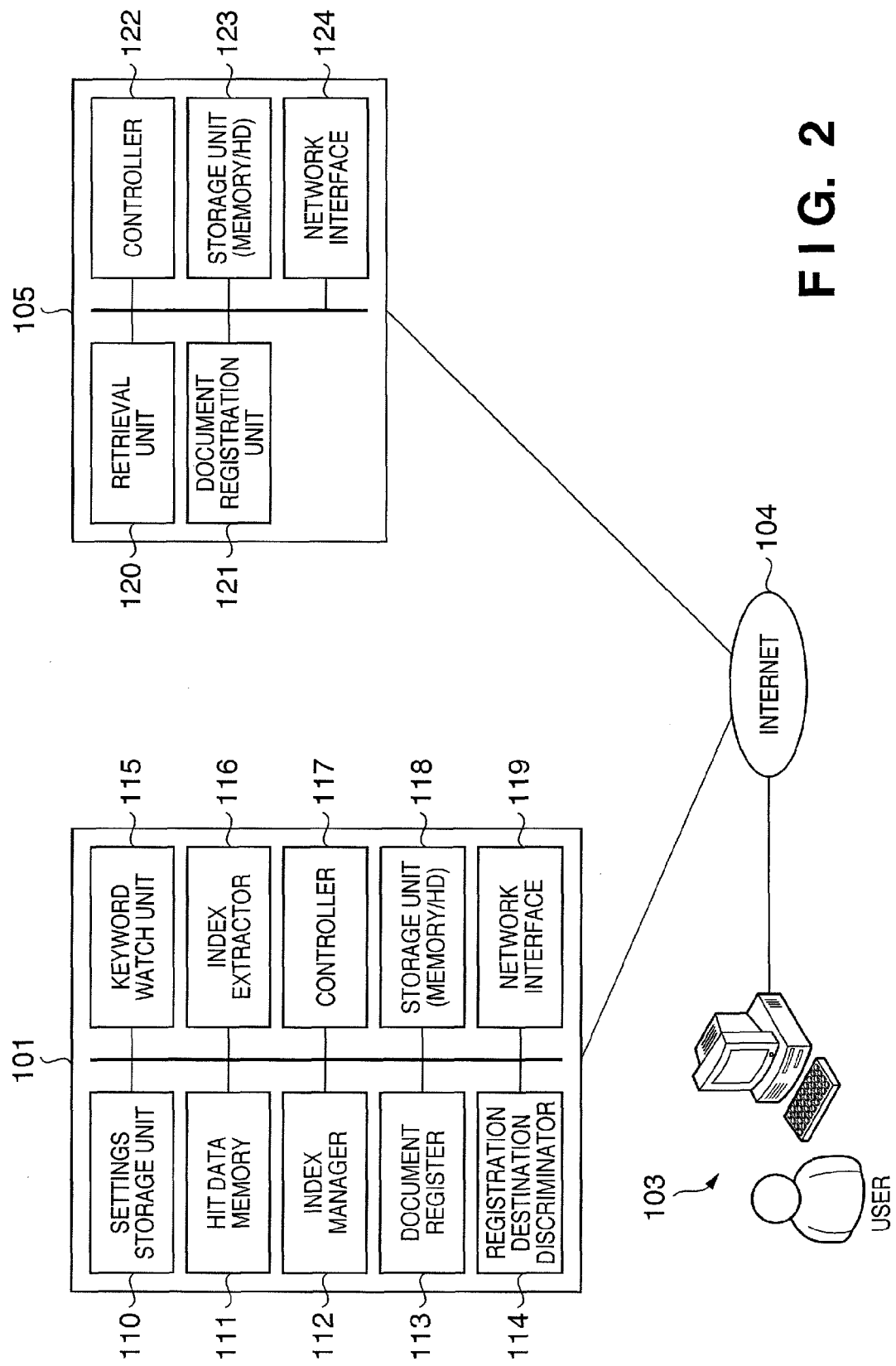
FIG. 2 is a block diagram illustrating a configuration of the document retrieving system according to an embodiment of the present invention.

FIG. 2 is a block diagram illustrating a configuration of the document retrieving system according to the first embodiment of the present invention.

This system includes the management server 101, the document server (document storage apparatus) 105 and the PC (personal computer) 103 that are mutually connected via Internet 104. Although two or more document servers (106, 107 for example) other than the document server 105 are connected to this system via the Internet 104, herein only the document server 105 is indicated as the representative example. The management server 101 may be incorporated in one of two or more document servers.

In this configuration, the user can access the management server 101 or the document server 105 to obtain document data by operating software called a browser that is provided in the PC 103. It should be noted that in each document server, the document data body and the index corresponding thereto are stored.

Although the Internet 104 is used in the first embodiment to connect the servers, the present invention is not limited to this. For example, LAN (local area network) or other network systems may be used.

The management server 101 is a server for offering functions for implementing document registration/retrieval services integrating two or more document servers. The user can register a document in each document server, or view, obtain, update or perform retrieval from the documents stored in the document servers by, for example, accessing a certain address (URL) provided by the management server 101 using the browser of the PC 103.

The management server 101 monitors the keywords that the user designates as the retrieval condition for retrieving a document. Then, according to settings data (the above-described collecting condition, for example) stored in a settings storage unit 110, the management server 101 extracts frequently-used keywords and judges whether or not to collect the indices corresponding to those keywords. When the indices corresponding to a certain keyword are collected, the management server 101 collects the indices corresponding to that keyword from the document servers and stores the same in a certain server (one of the document servers or the management server 101). In this case, by collecting the indices in the document server that stores the most documents corresponding to the collected indices, the retrieval described below can be more efficient.

Then, when the keyword that the user inputs with the PC 103 is the same as the keyword for which the indices have been collected, a retrieval request is made to the document server that stores the collected indices.

When the user registers a new document after the indices having been collected, it is determined whether or not the index produced from that document is to be collected. If the index is to be collected, the document body (document data) and its index are stored in the collection destination document server for the index.

On the other hand, the document server 105 stores the document body and the index, and offers functions such as registration, viewing, obtaining, updating and retrieval of documents. The user utilizes services offered by the document server 105 to access a predetermined address (generally URL) via the Internet 104, so as to access the documents stored in the document server 105.

When each of two or more document servers receives a retrieval request with a keyword being designated as the retrieval condition, references the indices stored therein and retrieves documents that correspond to the retrieval condition, and sends the retrieval results to the PC 103 or the management server 101.

When the document server 105 receives a document registration request from the PC 103, it offers a function to register that document on a document registration unit 121 provided therein.

Next, the management server 101 of the first embodiment is described.

The settings storage unit 110 stores various settings data. The settings data contains information used to determine, with respect to collection of indices that correspond to a certain keyword as described above, whether or not to collect the indices. In other words, when obtaining frequency of use of a keyword, the settings data defines the number of days to monitor the keyword and how many ranks of keywords below the ranking of the most-frequently-used keyword should be subject to the index collection. Alternatively, the settings data determines how many ranks of keywords below the ranking of the keyword that has the largest number of retrieved documents and/or the largest number of retrievals should be subject to the index collection. Further, the settings data determines whether or not to combine the frequency of use, and the retrieved document number and/or the number of retrievals. Also, the settings data contains information that identifies the document server 105 in which the collected indices are stored.

Furthermore, the settings data determines, with respect to registration of a document, the indices corresponding to how many ranks of keywords below the ranking of the most-frequently-used keyword are subject to comparison. Also, when the index of a registered document is subject to collection at the time registration, the settings data contains information on whether or not to register the document body on the collection destination server. It should be noted that the settings data can be arbitrarily set by a service providing party that manages the management server 101.

A hit data memory 111, based on a keyword designated as the retrieval condition, stores the number of indices sent from the document server 105 (i.e., number of hits) and the number of uses of the keyword in association with the document servers 105 to 107, as a hit table (see FIG. 8). An index manager 112, under the conditions based on the settings data stored in the settings storage unit 110, compares hit data of keywords stored in the hit data memory 111 to determine the keyword subject to the index collection. Then, the index manager 112 obtains the indices corresponding to the keyword from the document servers, and stores the indices in association therewith in a storage unit 118. In this manner, a collected index obtained by collecting (duplicating) indices frequently used is produced (see FIG. 9). The collected index thus obtained is sent to a document server that stores the most documents retrieved by the keyword to be stored therein.

A document register 113 registers a document whose registration is instructed by the user. A keyword watch unit 115 obtains a keyword designated by the user and information on the number of hits of the indices sent from the document server 105, and stores the same in the storage unit 118. An index extractor 116 produces, upon registration of a document, the index of the document. A registration destination discriminator 114, when the document is registered, identifies a document server in which the index extracted by the index extractor 116 is collected from among two or more document servers. Then, based on the information managed by the settings storage unit 110, the registration destination discriminator 114 determines whether registration of the document body in the collection destination document server for the index is required. When such registration is required, the collection destination document server for the index is selected as registration destination of the document. The controller 117 controls the overall operation of the management server 101. The storage unit 118 is configured by a RAM (202 in FIG. 3), a HDD (209 in FIG. 3) or the like and stores the above-described various tables and data under the control of the controller 117. A network interface 119 controls communications via the Internet 104 or LAN.

Next, the document server 105 is described.

A retrieval unit 120, when it receives a keyword as the retrieval condition from the PC 103, performs retrieval from indices registered in a document registration unit 121 to extract indices that include the keyword. The document registration unit 121, when it is instructed to register a document from the PC 103, stores the document body and the index extracted from that document in a storage unit 123. A controller 122 controls the overall operation of the document server 105. The storage unit 123 is configured by the RAM (202 in FIG. 3), the HDD (209 in FIG. 3) or the like and stores various data such as the above-described tables under the control of the controller 122. A network interface 124 controls communications via the Internet 104 or LAN.

The management server 101 and the document server 105, as well as the PC 103 that the user uses, are configured by an information processing apparatus (computer) including a CPU, a ROM, a RAM, a HDD and the like, as described below. Also, these servers offer functions via web service, for example.

Figure 3:
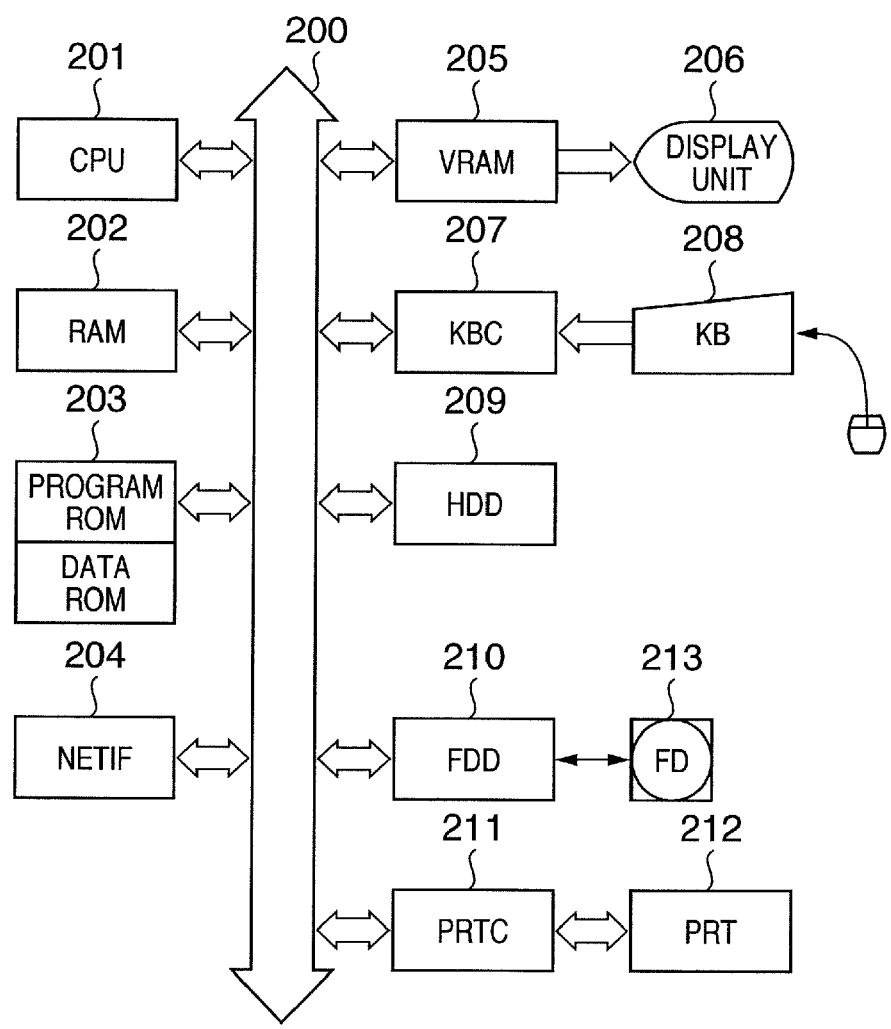
FIG. 3 is a block diagram illustrating a specific hardware configuration of a management server and a document server according to the embodiment of the present invention.

FIG. 3 is a block diagram illustrating a specific hardware configuration of the management server 101 and the document server 105 according to the present embodiment. The above-described PC 103 also has the same hardware configuration.

In FIG. 3, the CPU 201 controls the overall process of the server in accordance with programs stored in a program ROM 203 and a RAM 202. The RAM 202 functions as a main memory for the CPU 201, and as an area for execution programs, an execution area for the programs, and data area. The program ROM 203 is a read-only memory storing the operation procedure of the CPU 201. The program ROM 203 includes a program RON storing basic software (OS) that is a system program for controlling the server devices, and a data ROM storing information required to operate the system or the like. It is possible that instead of the ROM 203, the system program is installed on an HDD 209 (described later), and the program is loaded on the RAM 202 to be executed upon execution thereof. A network interface (NETIF) 204 controls data transmission via the Internet 104, LAN or the like, and assesses connection status. A video RAM 205 stores display data for a display unit 206. The display unit 206 is a display device such as a liquid crystal display or CRT display. A keyboard controller (KBC) 207 outputs a signal input by a keyboard 208 or a pointing device to a bus 200. The HDD 209 is a hard disk drive, which is used for storing application programs or various data (also functions as the above-described information storage units 118 and 123). An FDD 210 controls writing and reading-out of data with respect to a removable disk (storage medium) 213 such as a floppy (registered trademark) disk drive and CD-ROM drive. Examples of the storage medium 213 includes an FD or an external hard disk, an optical storage medium (CD-ROM for example), a magneto-optical storage medium (MO for example), a semiconductor storage medium (memory card for example) or other removable data storage devices (removable media) It is also possible to utilize application programs or data stored on the HDD 209, with storing the same on the FDD 210. A printer controller (PRTC) 211 is for controlling output signals to a printer (PRT) 212. The printer 212 is a printing apparatus such as a laser beam printer (LBP). The bus 200 is a transmission bus for connecting the above-described units (address bus, data bus, input/output bus and control bus).

It should be noted that the settings storage unit 110, the hit data memory 111, the index manger 112, the document register 113, the registration destination discriminator 114, the keyword watch unit 115, the index extractor 116 and the like of the management server 101 shown in FIG. 2 are realized by the CPU 201 and the RAM 202, the HDD 209 and programs. The retrieval unit 120, the document registration unit 121 and the like of the document server 105 are realized by the CPU 201 and the HDD 209, programs and the like.

Figure 4:
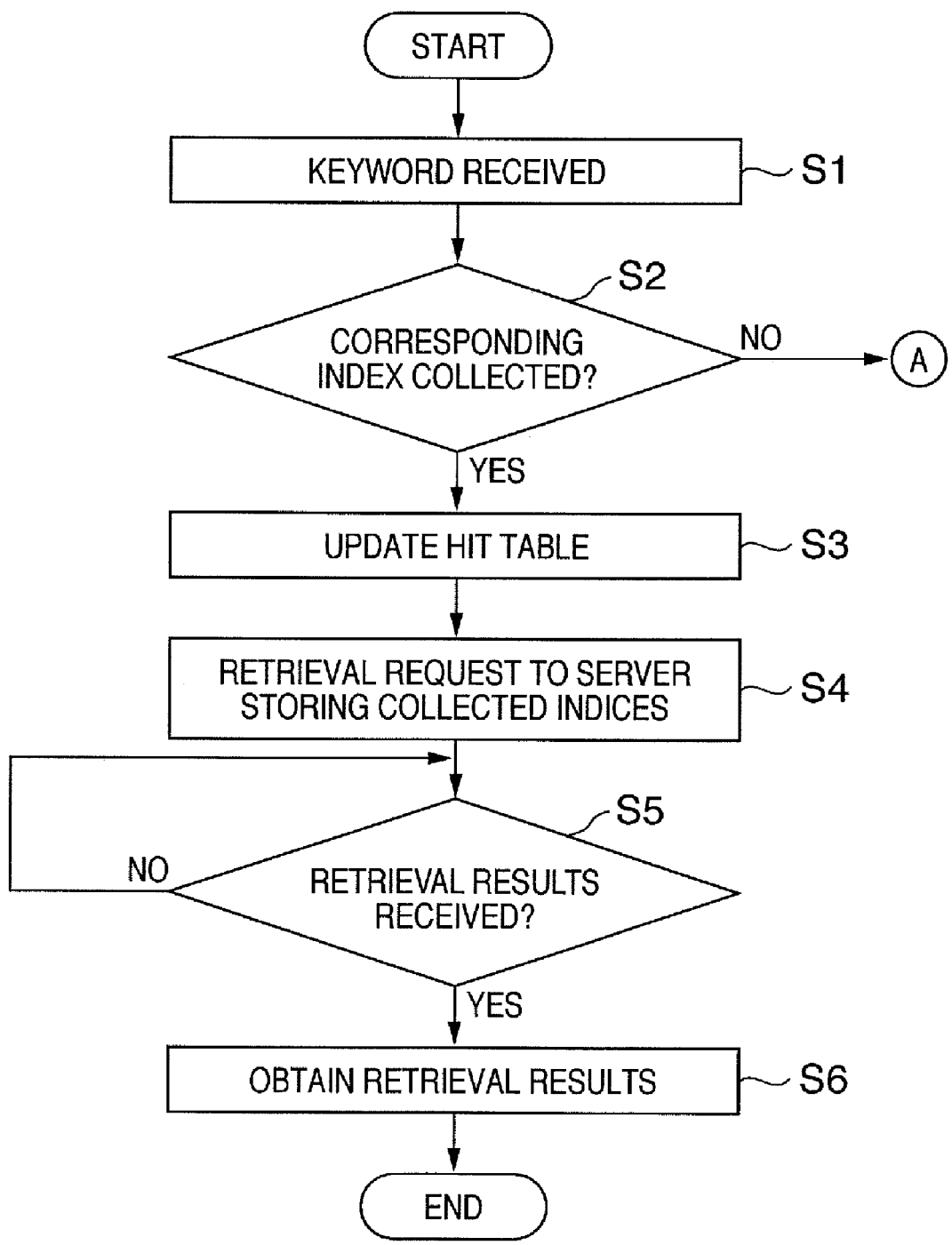
FIGS. 4 and 5 are flowcharts describing retrieving process on the management server according to the embodiment of the present invention.
Figure 5:
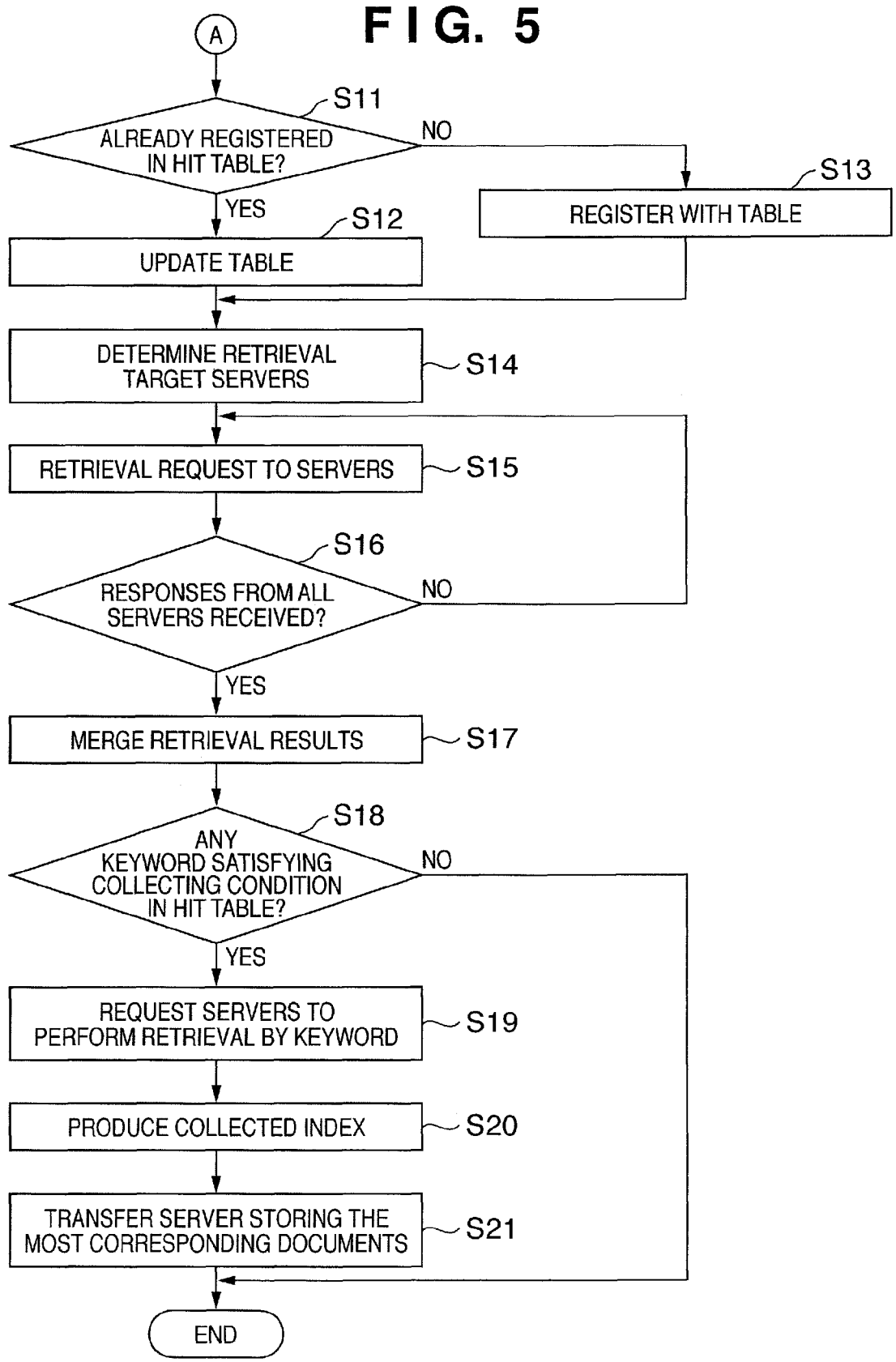

FIGS. 4 and 5 are flowcharts describing retrieving process on the management server 101 according to the first embodiment. The program for executing this process is stored in the ROM 203 or the RAM 202 and is executed under the control of the CPU 201.

In step S1, a retrieval instruction and a keyword used as the retrieval condition input by the user in the PC 103 are received.

FIG. 7 is a diagram illustrating an exemplary keyword input window displayed when the user inputs a keyword for retrieval in the PC 103.

FIG. 7 shows a state in which the keyword "project A" is input in a dialog box 701 for inputting a keyword. When an "execute" button 702 is designated in this state, a retrieval instruction and the input keyword ("project A") are sent from the PC 103 to the management server 101.

This means retrieving documents that contain the character string of "project A" in their bodies or document names. The "execute" button 702 instructs to start retrieval.

Next, the procedure proceeds to step S2, in which it is determined whether the indices corresponding to the keyword received in step S1 have been collected. Here, by referring to the table shown in FIG. 11 for example, the server in which the indices corresponding to the keyword are collected is identified and retrieval is requested to that server. That is, an inquiry is made to the index manager 112 based on the keyword obtained in step S1, so as to ascertain whether the indices corresponding to the keyword have been collected.

In this manner, if it is determined that the indices corresponding to the keyword have been collected, the procedure proceeds from step S2 to step S3, in which hit data of a hit table stored in the hit data memory 111 is updated.

In this manner, the document server in which the indices of the documents corresponding to the input keyword are collected can be identified. Therefore, by requesting the identified server to perform retrieval, it is possible to perform retrieval from documents stored in other document servers as well, which improves the retrieval efficiency.

FIG. 8 is a diagram showing an exemplary hit table stored in the hit data memory 111 according to the first embodiment.

In the example of FIG. 8, with respect to each of the keywords "project A", "Tokyo" and "camera", the number of uses, name of servers storing retrieved documents (name of the document server), the number of retrieved documents in each server, registration date, update date are registered. The number of uses is incremented by one each time the corresponding keyword is used. Accordingly, it is possible to recognize how many times the keyword has been used. The number of retrieved documents is information that indicates how many documents are retrieved as a result of retrieval by the keyword from the indices stored in each server.

Thus, in step S3, if the keyword is, for example, "project A", for each document server that stores documents corresponding to the keyword, the number of uses of the keyword is incremented by one.

FIGS. 9A and 9B are diagrams showing an exemplary collected index table of the first embodiment that stores a collected index in which the indices corresponding to the keyword ("project A") are collected. This collected index table is, for example, stored in the storage unit 118 of the document server 105.

FIG. 9A shows a state in which documents containing the indices corresponding to the keyword "project A" are stored in the respective document servers. That is, the document server 105 stores "document 1" and "document 2" as the document containing the character string of the keyword "project A". In the document server 106, four documents including "document 3" to "document 6" are stored as the document containing the character string of the keyword "project A". In the document server 107, three documents including "document 7" to "document 9" are stored as the document containing the character string of the keyword "project A".

FIG. 9B shows a state in which the indices corresponding to the keyword "project A" are registered collectively as the collected index in the document server 106.

In this example, the collected index is produced by collecting the indices of the "document 1" to "document 9" in the document servers 105 to 107 as the indices corresponding to the keyword "project A". Then, the collected index is registered in the document server 106, which stores the most documents corresponding to the collected indices.

At this time, in the table shown in FIG. 11, a storage destination of the collected index table for the keyword "project A" is the "document server 106".

Returning to FIG. 4, the procedure proceeds to step S4 after the hit table is updated in step S3. The document server in which the collected indices are registered is identified. In the above-described example of FIG. 9, this corresponds to the document server 106. In step S4, a retrieval request is sent to the document server 106 by transmitting the keyword. In step S5, the PC 103 waits for the retrieval results from the document server 106, and when the retrieval results are received, the procedure proceeds to step S6 in which the obtained results are displayed. Accordingly, the user of the PC 103 can understand the document server in which a desired document is registered based on the retrieval results, and obtain the desired document from the document server.

FIG. 10 is a diagram illustrating an exemplary window displaying the document retrieval results.

In FIG. 10, document names retrieved by the keyword ("project A"), the document servers in which the documents are registered, the size and update date and time of the documents are listed. Information other than the above-described document information (who prepared the document, etc.) may be displayed as well.

When indices corresponding to a keyword for retrieval are registered as a collected index, the retrieval efficiency improves since only accessing a certain server is required.

On the other hand, if indices corresponding to a keyword are not registered in the collected index table in step S2, the procedure proceeds to step S11 (FIG. 5) to determine whether the keyword is registered in the hit table of the hit data memory 111. If the keyword is registered, the procedure proceeds to step S12, and updates the corresponding hit table. If the keyword is not registered, the procedure proceeds to step S13, in which the keyword is registered in the hit table. After performing step S12 or step S13 in this manner, the procedure proceeds to step S14. In step S14, the document server subject to retrieval by the keyword is identified, and the keyword is transmitted to the document server to request retrieval. In step S16, it is examined whether the retrieval results have been received from all the document servers subject to the retrieval. If received, the procedure proceeds to step S17, in which the retrieval results from the document servers are merged. Processes performed in these steps S14 to S17 are similar to those of conventional multi-server retrieving process (FIG. 1A).

Next, in step S18, it is determined whether there exists any keyword that satisfies the settings data (collecting condition) stored in the settings storage unit 110 based on the hit table updated through the process in step S12. Here, the settings data (collecting condition) of the settings storage unit 110 includes for example, whether one week, which is the update period, has elapsed from the last update date, or whether the indices corresponding to keywords having the first to the third frequencies of use are selected, etc. Such pieces of settings information may be used separately or in combination in order to determine the indices to be registered in the collected index table.

For example, in FIG. 8, the current date is assumed to be Nov. 7, 2005. Assuming that the settings data of the settings storage unit 110 is such that a keyword that has any of the first, second or third frequency of use and has been updated within one week is subject to index collection. In this case, since a keyword which has been updated within one week is subject to index collection, the subject update date is on and after Nov. 1, 2005. Therefore in this case, only the keyword "project A" is subject to index collection.

When it is determined in step S18 that there is no index to be newly registered, the process is terminated without further operation. If it is determined that there is any index to be newly registered, the procedure proceeds to step S19, and request each document server to perform retrieval by that keyword. Then, each document server retrieves the indices of the documents that include the keyword with the retrieval unit 120. Then, base on the retrieval results from each document server, a collectable index group is obtained (step S20). In this case, the index manager 112 produces a collected index table as shown in FIG. 9B. Then the step proceeds to step S21, the collected index table is transferred to the document server that stores the most documents corresponding to the collected indices (in the above example, the document server 106), and the process is terminated. The table shown in FIG. 11 is also updated accordingly.

Next, process to register document data is described.

Figure 6:
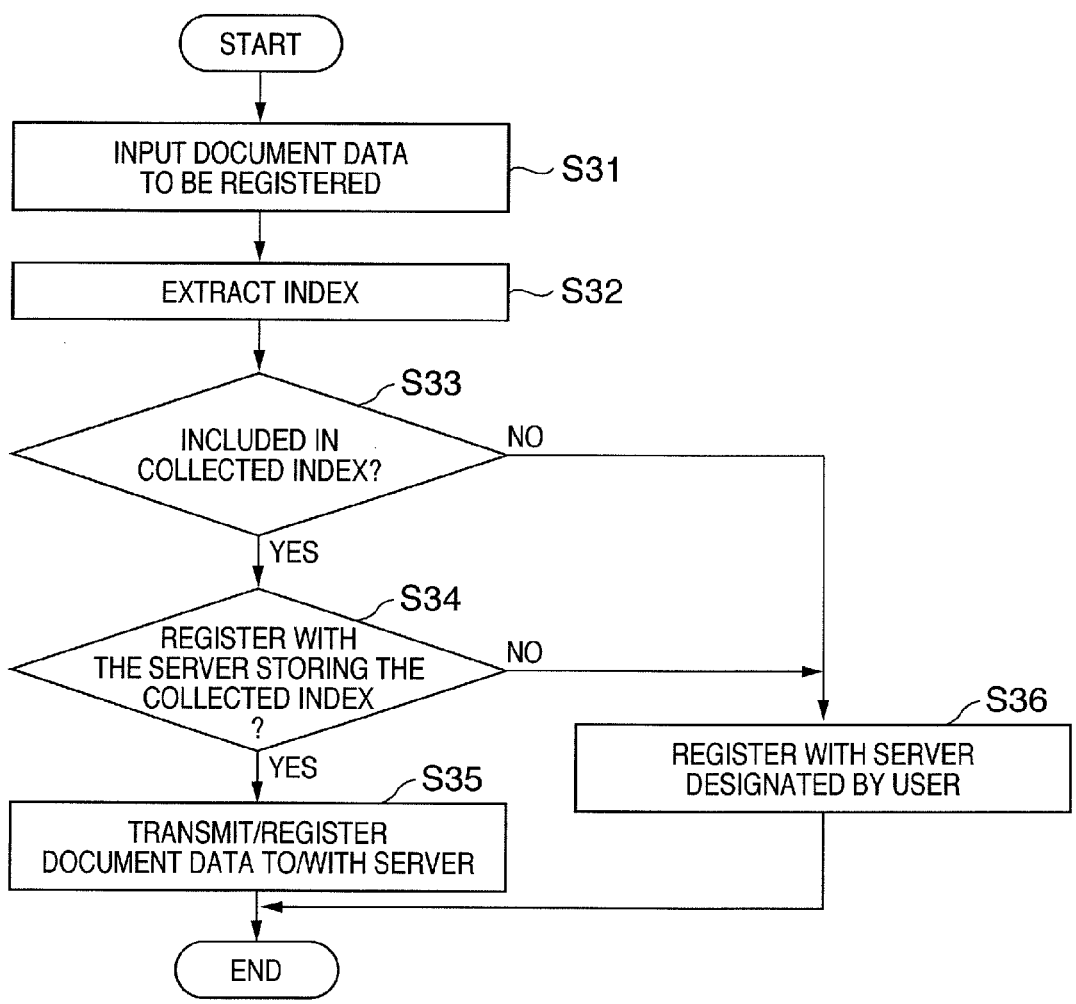
FIG. 6 is a flowchart describing a process to register new document data in the document retrieving system according to the embodiment of the present invention.

FIG. 6 is a flowchart describing a process to register document data on the document retrieving system according to the first embodiment.

In step S31, document data to be registered is input. In step S32, based on the document data, the index thereof is extracted by the index extractor 116. Next, in step S33, it is determined whether the extracted index has been already registered as the above-described collected index. When registered, the procedure proceeds to step S34, and it is determined whether or not to register the document body (document data) in the document server that stores that collected index (in the above-described example, the document server 106). This determination is made based on the settings data stored in the settings storage unit 110. In this case, if setting is such that the document body is registered in the document server that stores the collected index, the procedure proceeds to step S35, in which the document data is registered in the document server.

As a result, since document data is registered in the document server in which keywords frequently used for retrieval are registered, the user operability will be improved.

On the other hand, in step S33, if the extracted index is not registered as the above-described collected index, or in step S34, setting is such that the document data is registered in a document server other than the server that stores the collected index, the procedure proceeds to step S36, and the document data is registered in a document server designated by the user.

Although a case in which retrieval is performed from documents stored in document servers was described, the documents may be text data or image data such as bitmap data. It is also possible to apply the present invention to a case in which retrieval is performed from images that do not include character string information.

Embodiment 2

Next, a second embodiment of the present invention is described. In the first embodiment, the indices of the documents stored in two or more document servers 105 to 107 are collected in the document server that stores the most corresponding documents, and the PC 103 makes a retrieval request to the collection destination document server.

In contrast, in the second embodiment, the indices are collected to an apparatus that requests retrieval (in the first embodiment, PC 103). Accordingly, when a keyword for which the corresponding indices have been already collected is designated as the retrieval condition, it is possible for that apparatus to perform retrieval from the documents stored in the respective document servers by referring to the indices colleted in its own apparatus (PC 103). That is, since it is not required to request retrieval via the Internet, the retrieval efficiency can be further improved.

Figure 12:
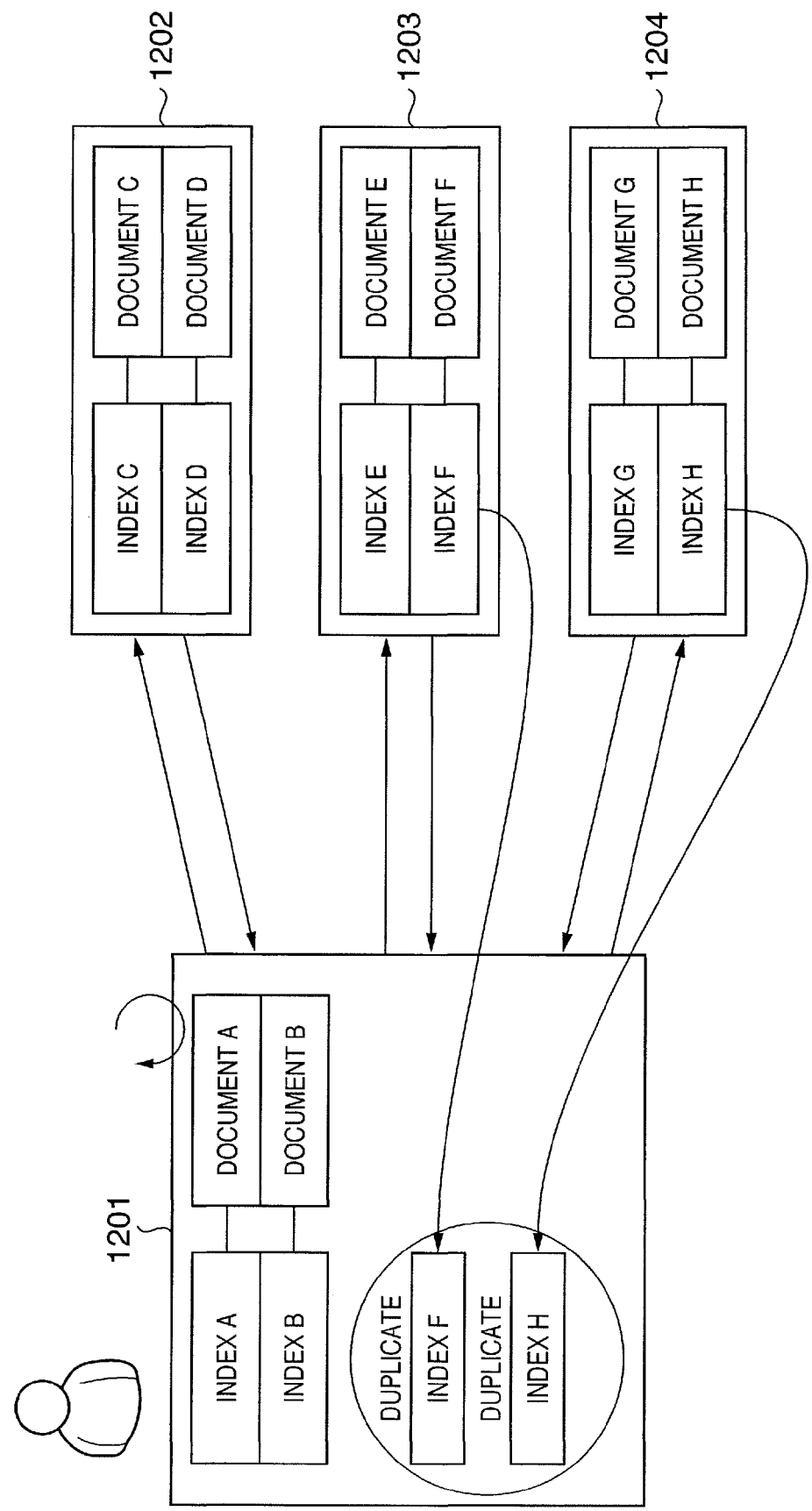
FIG. 12 is a diagram illustrating characteristics of a configuration of the document retrieving system according to the embodiment of the present invention.

FIG. 12 is a diagram illustrating characteristics of a configuration of the document retrieving system according to the second embodiment of the present invention.

The document retrieving system of the second embodiment includes document servers 1201 to 1204 that are similar to the document servers 105 to 107 described in the first embodiment, and capable of storing documents and the indices of the documents. The document server 1201 has a function to receive input of a retrieval instruction and a keyword as the retrieval condition from the user in a similar manner to the PC 103, and request the document servers 1202 to 1204 to perform retrieval.

The document retrieving system of the second embodiment may include other document servers in addition to the document servers 1201 to 1204.

The user of the document server 1201 can perform retrieval from documents stored in the document server 1201 or any of the document servers 1202 to 1204 by inputting a keyword as the retrieval condition. The document server 1201 that has received the keyword input from the user transmits the input keyword to the document servers 1202 to 1204 and requests them to perform retrieval. The document servers 1202 to 1204 that have received the keyword respectively refer to the indices stored in their own servers to retrieve documents that contain the received keyword, and notify the retrieval results to the document server 1201, which has made the retrieval request.

At this time, since documents and the indices of the documents are stored also in the document server 1201, the document server 1201 performs retrieval from the documents stored in its own device by referring to the indices stored therein as well.

Here, in a case that the document server 1201 performs retrieval from the documents stored in the document servers 1201 to 1204, the document server 1201 can finish the retrieval in a shorter time when performing retrieval from the documents stored in its own server than when requesting the document servers 1202 to 1204 to perform retrieval and receiving the retrieval results. Specifically, in a case that the document server 1201 requests the document servers 1202 to 1204 to perform retrieval via the network, the document server 1201 is required to wait until it receives the retrieval results from all the document servers.

On the other hand, in a case that the document server 1201 performs retrieval from the documents stored in its own device, it can finish the retrieval in a shorter time since data exchange via the network is not required. Therefore, in the second embodiment, the indices of documents that satisfy certain conditions are collected in advance in a document server that is likely to be operated by the user for retrieval.

For example, in the example shown in FIG. 12, duplicates of an index F of a document F stored in the document server 1203 and an index H of a document H stored in the document server 1204 are stored in the document server 1201 as well. As a result, if the user next time instructs retrieval in the document server 1201, since the indices of the documents F and H are stored in the document server 1201, it is possible to obtain the retrieval results in a shorter time.

Figure 13:
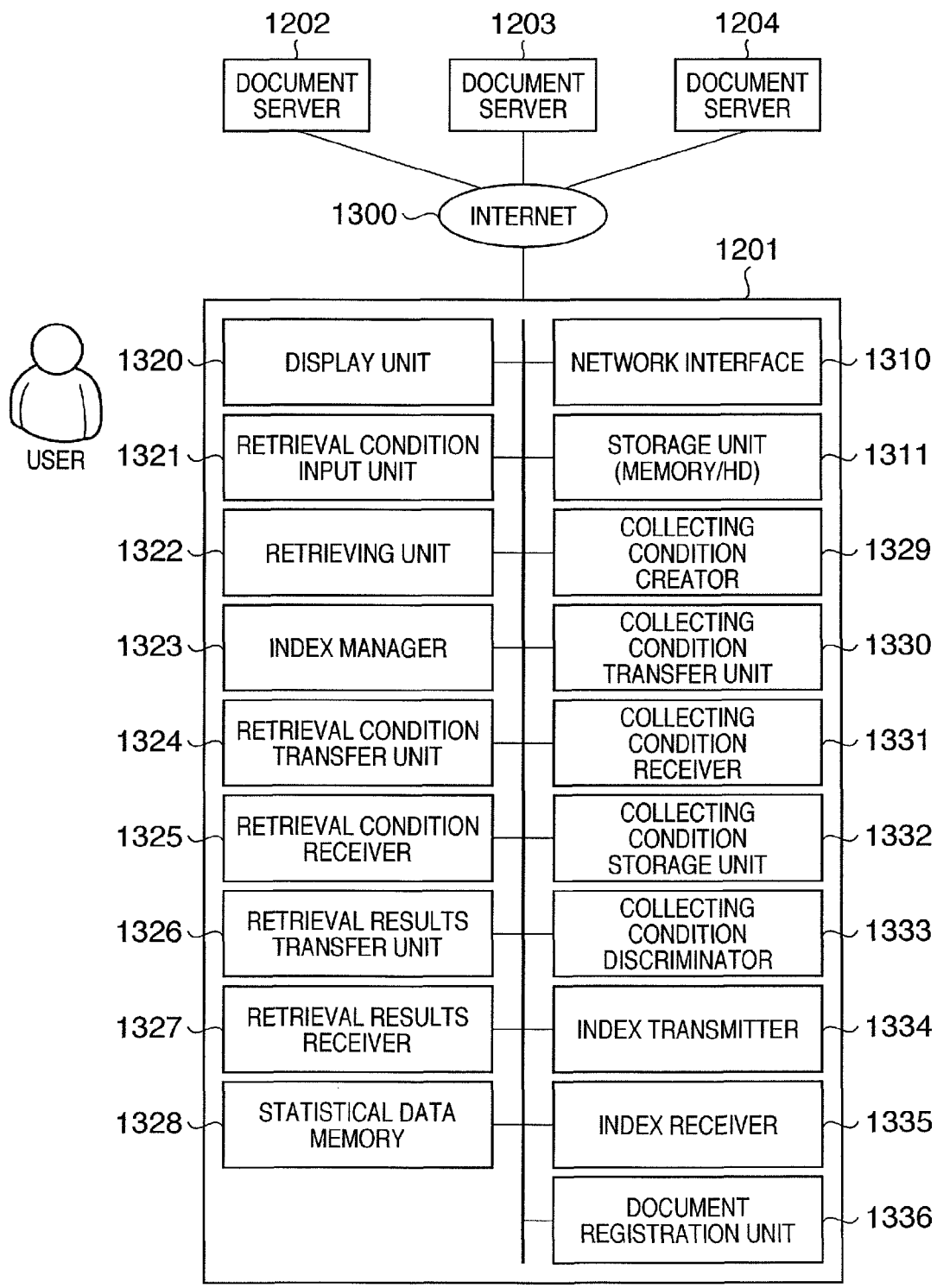
FIG. 13 is a block diagram illustrating a configuration of the document retrieving system according to the embodiment of the present invention.

FIG. 13 is a diagram illustrating a configuration of the document retrieving system according to the second embodiment. The system includes two or more document servers 1201 to 1204 that are connected via Internet 1300. Although the Internet 1300 is used to connect the servers, the present invention is not particularly limited to this. For example, LAN or other network system may be used.

The document servers 1201 to 1204 respectively store the document bodies and document indices, and offer functions such as registration, viewing, obtaining, updating and retrieval of documents. The user uses the retrieval function that the document servers 1201 to 1204 offer, to retrieve documents registered in the system. The document servers 1201 to 1204 are respectively, upon receiving a retrieval request with a keyword being designated, judge whether the keyword corresponds to the indices managed by the servers. If the keyword corresponds to an index, the servers notify the user of such an effect. When a document is registered, the document servers 1201 to 1204 offer the function to register that document.

Next, the configuration of the document server 1201 is described. The configuration of the document servers 1202 to 1204 may be similar to that of the document server 1201, or may be similar to that of the document servers 105 to 107 of the first embodiment.

A display unit 1320 is a display device such as LCD display provided in the document server 1201. A retrieval condition input unit 1321 receives a retrieval keyword input by the user by displaying a window as shown in FIG. 7 on the display unit 1320. A retrieving unit 1322, when it receives from the user a retrieval request with a keyword designated as the retrieval condition, performs retrieval by referring to the indices stored in its own device, and provides the retrieval results to the user. When a retrieval request is received from other document server, the retrieving unit 1322 performs the retrieval in a similar manner and provides the results to the document server that has requested the retrieval.

The retrieval results are displayed on the display unit 1320 so as to notify the user of the same. An index manager 1323 manages all the indices stored in the document server 1201. The document bodies and indices are stored in a storage unit 1311. In addition, the indices stored in the document server 1201 include the indices corresponding to the document bodies stored in its own device, and the indices of the documents whose bodies are stored in other document servers.

A retrieval condition transfer unit 1324 transfers the retrieval keyword input in the retrieval condition input unit 1321 to other document servers. On the other hand, a retrieval condition receiver 1325 receives the retrieval keyword transmitted from other document servers. A retrieval results transfer unit 1326 transfers the results of retrieval performed by the retrieving unit 1322 to other document servers. On the other hand, a retrieval results receiver 1327 receives the retrieval results transmitted from other document servers, and displays the same on the display unit 1320. A statistical data memory 1328 stores statistical data and the like concerning the keyword input in the retrieval condition input unit 1321.

A collecting condition creator 1329 extracts conditions for index collection in the document server 1201 based on the statistical data stored in the statistical data memory 1328. The collecting condition used herein is made up of a keyword contained in the index of each document and information indicating a collection destination document server or the like. A collecting condition transfer unit 1330 transfers a collecting condition created by the collecting condition creator 1329 to other document servers. A collecting condition receiver 1331 receives a collecting condition transmitted from other document servers.

A collecting condition storage unit 1332 stores the collecting conditions created by the collecting condition creator 1329 and the collecting condition received from other document servers in the storage unit 1311. A collecting condition discriminator 1333 determines the indices that fall under the collecting condition from among the indices managed by the index manager 1323, based on the collecting condition stored in the collecting condition storage unit 1332.

An index transmitter 1334 transfers the indices determined to be collected by the collecting condition discriminator 1333 to the designated document server. An index receiver 1335 receives the indices transferred from other document servers and stores the same in the storage unit 1311.

A document registration unit 1336 registers a new document in the document server 1201. The body of a document to be registered (and corresponding index) is input via a network interface 1310 from an external apparatus (not shown). At this time, the document registration unit 1336, when a document to be registered is determined to be subject to index collection by the collecting condition discriminator 1333, transmits the index corresponding to that document to the designated document server with the index transmitter 1334.

The hardware configuration of the document servers 1201 to 1204 are similar to those of the management server 101 and the document server 105 shown in FIG. 3.

Figure 14:
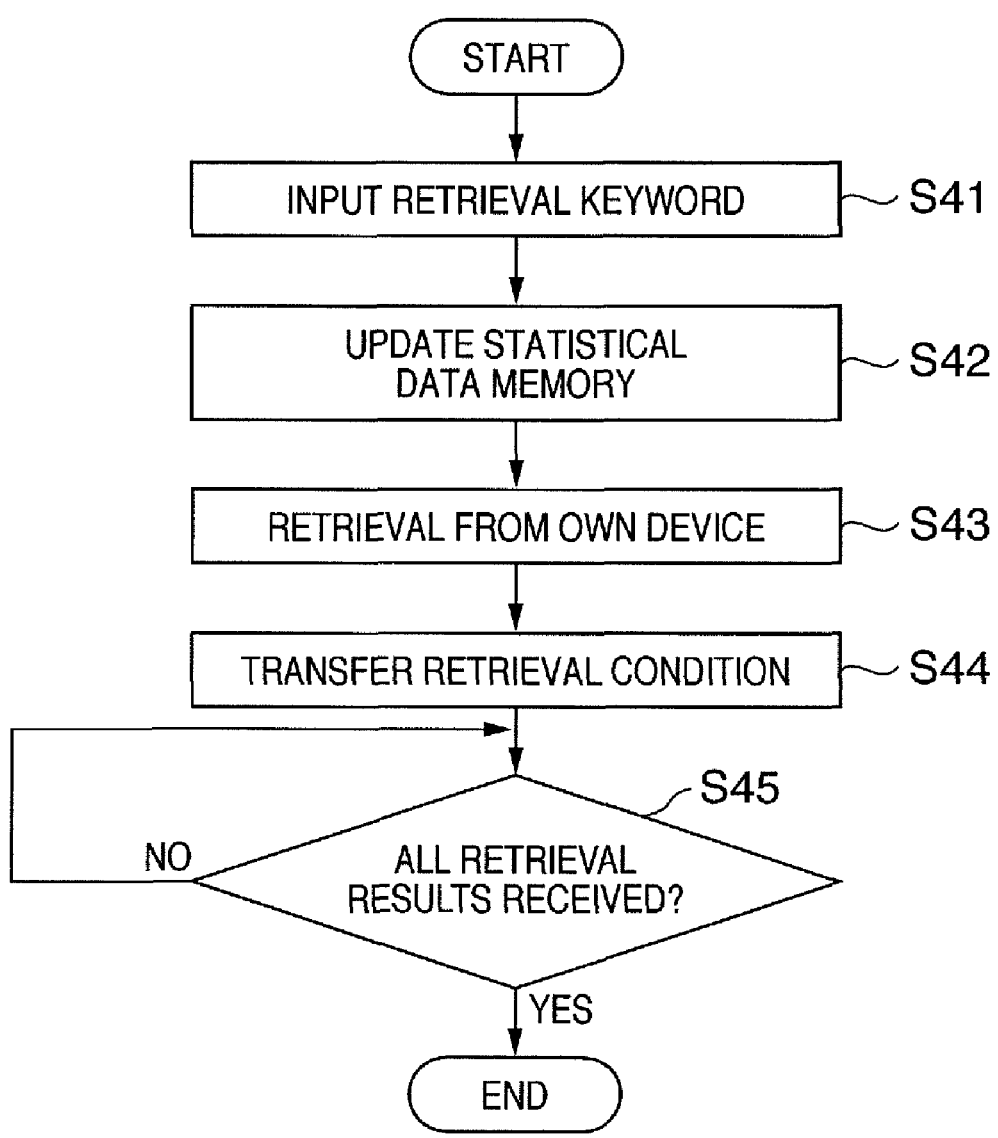
FIG. 14 is a flowchart describing retrieving process on the document server according to the embodiment of the present invention.
Figure 19:
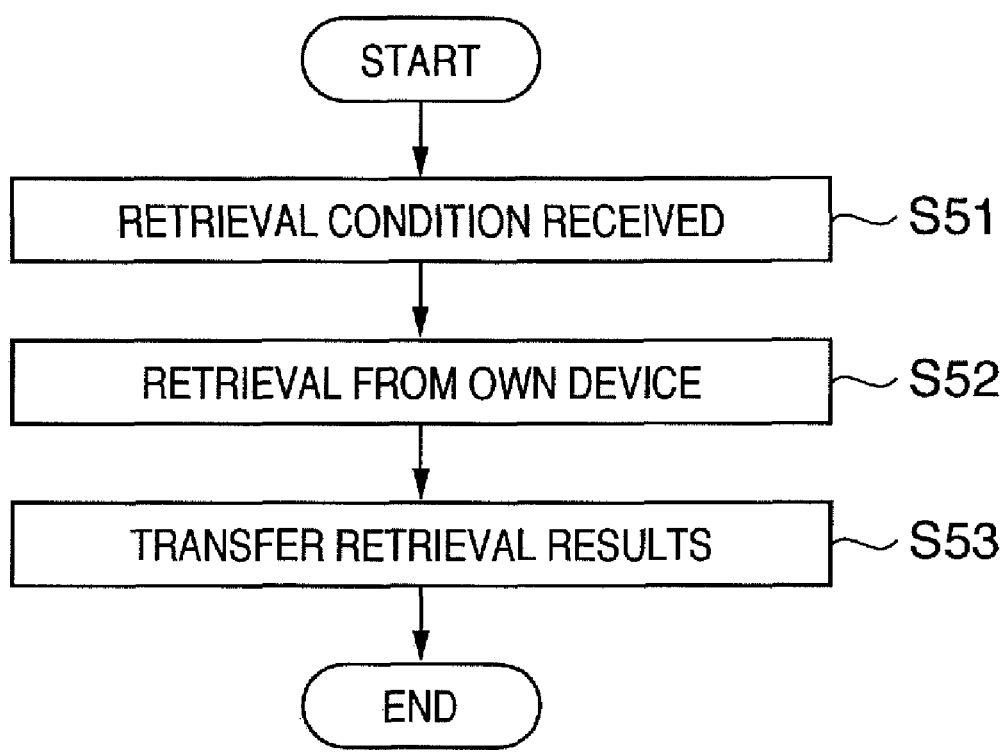
FIG. 19 is a flowchart describing a retrieving process on the document server according to the embodiment of the present invention.

FIGS. 14 and 19 are flowcharts describing retrieving process on the document server according to the second embodiment. The program for executing this process is stored in the ROM 203 or the RAM 202 and is executed under the control of the CPU 201.

FIG. 14 describes process on a document server (in this case the document server 1201) that the user operates to perform retrieval. In step S41, a retrieval instruction and the keyword for the retrieval input by the user are received. An exemplary window to input the retrieval keyword is similar to that described in FIG. 7. Then the procedure proceeds to step S42, in which the keyword input in step S1401 is added to the information stored in the statistical data memory 1328 for updating.

The statistical data memory 1328 is in the format of table as shown in FIG. 15. In FIG. 15, with respect to keywords used for retrieval, the number of retrievals is counted. That is, every time a predetermined keyword is designated as the retrieval condition, its number of retrievals is incremented by one, thereby counting the number of retrievals.

Then, the procedure proceeds to step S43, in which the retrieving unit 1322 determines whether the index containing the character string of the keyword received in step S41 is registered in its own device. In this case, it is determined whether the index containing the character string of the keyword received in step S41 is registered by referring to a table as shown in FIG. 16. The table shown in FIG. 16 is managed by the index manager 1323. The index manager 1323 updates the information of the table from time to time in accordance with addition/deletion of the index.

In the example shown in FIG. 16, the index title, retrieval keyword and location of document are stored associated to each other. Looking at the column of the location of document, indices indicating document servers other than the document server that performs the retrieval (in this case the document server 1201) are included. This indicates that indices of documents registered in other document servers are duplicated in the document server 1201 that performs the retrieval.

The procedure proceeds to step S44, in which the retrieval condition transfer unit 1324 transfers the retrieval condition to other document servers (in this embodiment, document servers 1202 to 1204).

FIG. 17 is a diagram showing an exemplary retrieval condition transmitted in step S44. In FIG. 17, the retrieval keyword and the document server to which retrieval results are sent are designated.

Then the procedure proceeds to step S45, in which the retrieval results receiver 1327 receives the retrieval results from other document servers. In a case that the retrieval results are received from all the document servers to which the retrieval condition has been transferred in step S44, a series of processes is terminated. Of the retrieval results, including those received from other document servers, those retrieved by the retrieval are displayed on the display unit 1320 from time to time without waiting for receipt of all the retrieval results.

FIG. 18 is a diagram showing an exemplary retrieval result display of the document server (document server 1201) that the user operates to perform retrieval.

FIG. 18 shows the retrieval results when "orange" is designated as the retrieval keyword. If the indices stored in the document server 1201 are as those shown in FIG. 16, the index A and the index C contain "orange" as the keyword and therefore retrieved as a result of the document server 1201 performing retrieval from the documents stored therein. Reference numeral 1801 denotes the retrieval results retrieved as a result of the document server 1201 performing retrieval from the documents stored therein, which are displayed relatively in a short time. Reference numeral 1802 denotes the retrieval results retrieved from the other document servers 1202, 1203 and 1204. In this case, since the retrieval results are received from the other document servers via the Internet 1300, it often takes time before the results are displayed compared with the retrieval results 1801.

FIG. 19 is a flowchart describing processing operation on the document servers (in this embodiment, the document servers 1202 to 1204) to which the retrieval condition as shown in FIG. 17 is transferred in step S44 in FIG. 14.

In step S51, the retrieval condition receiver 1325 receives the retrieval condition. Then the procedure proceeds to step S52, in which the retrieving unit 1322 determines whether any index containing the keyword character string received in step S51 is registered in its own device. Here, the retrieval is performed by a similar method to that used in step S43, that is, by the retrieving unit 1322 retrieving the indices that include the keyword received in step S51 as the retrieval keyword with referring to a table as shown in FIG. 16 stored in each document server. The procedure proceeds to step S53, in which the retrieval results transfer unit 1326 transfers the retrieval results obtained in step S52 to the designated document server. At this time, the retrieval results transfer unit 1326 transfers the retrieval results even if the number of retrieved index is "0".

Nest, index collecting process is described taking the document server 1201 as an example.

Figure 20:
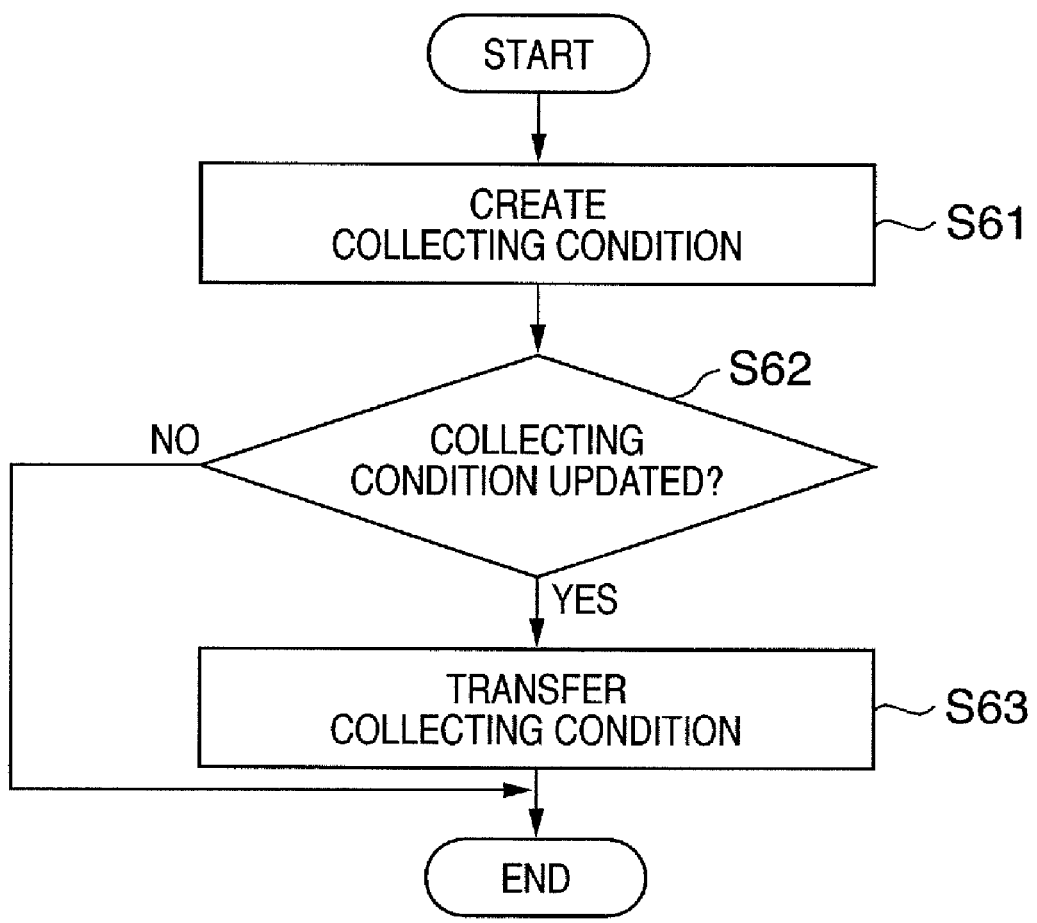
FIG. 20 is a flowchart describing a creating process for a collecting condition on the document server according to the embodiment of the present invention.
Figure 22:
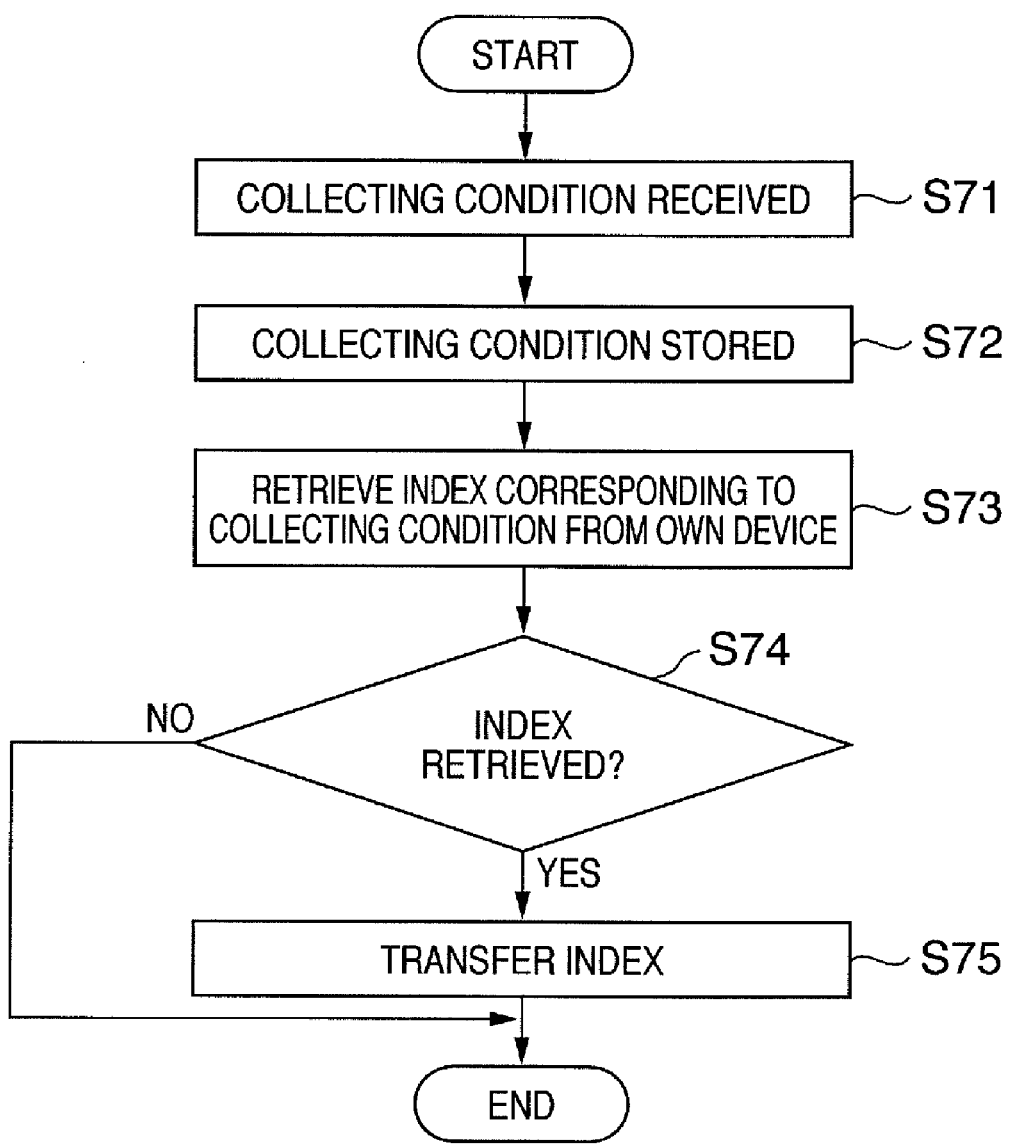
FIG. 22 is a flowchart describing a process to collect indices on the document server according to the embodiment of the present invention.
Figure 23:
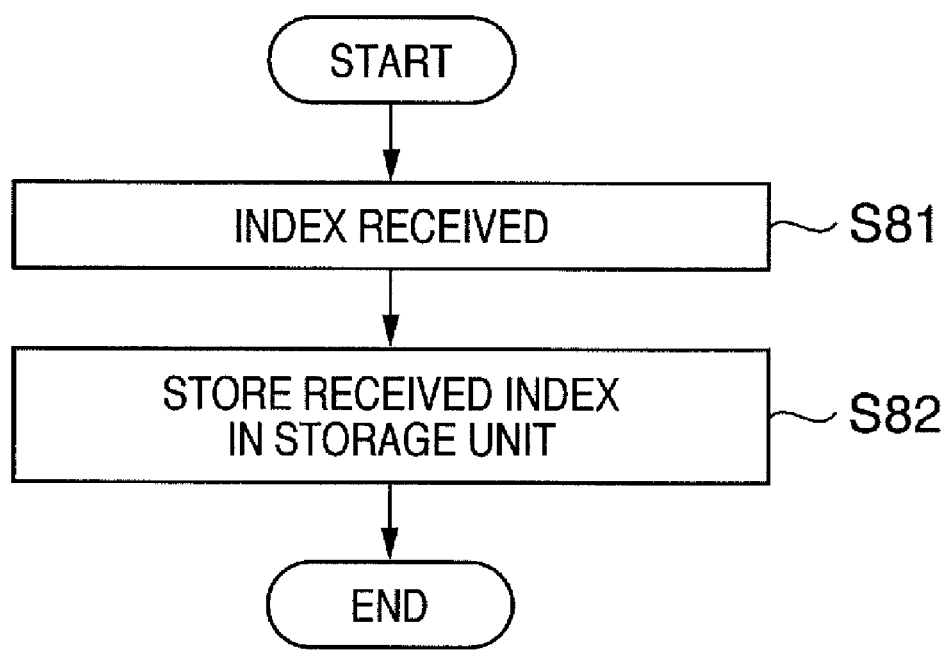
FIG. 23 is a flowchart describing a process to collect indices on the document server according to the embodiment of the present invention.

FIGS. 20, 22 and 23 are flowcharts describing the index collecting process performed on the document server 1201.

First of all, in step S61, the collecting condition creator 1329 refers to the statistical data memory 1328 to extract as the collecting condition keywords that have been frequently designated as the retrieval condition for retrievals from its own device. Here, indices including the keywords extracted as the collecting condition are acquired from other document servers (the document servers 1202 to 1204) and duplicates thereof are created in the document server 1201, so that the indices including such keywords are collected in the document server 1201.

The collecting condition created in this manner is stored in the collecting condition storage unit 1332. The collecting condition may be created on a regular basis or on an arbitrary basis triggered by operation by the user. For example, the collecting condition may be created triggered by updating of the statistical data stored in the statistical data memory 1328 in step S42.

Then, the procedure proceeds to step S62, in which it is determined whether the collecting condition already stored in the collecting condition storage unit 1332 has been updated. When updated, the procedure proceeds to step S63, and the collecting condition transfer unit 1330 transfers the updated collecting condition to other document servers (in this embodiment, the document servers 1202 to 1204).

FIG. 21 is a diagram showing an exemplary collecting condition transferred in step S63 in FIG. 20.

The collecting condition contains the keyword extracted in step S61 and information indicating the collection destination server for the keyword. At this time, the document server 1201 suspends a series of processes and stays in the stand-by state until it receives the indices transmitted from the other servers.

FIG. 22 is a flowchart describing a processing operation on the document server that has received the collecting condition transferred in step S63 in FIG. 20.

Initially, the collecting condition receiver 1331 receives the collecting condition in step S71. The procedure proceeds to step S72, in which the collecting condition received in step S71 is stored in the collecting condition storage unit 1332.

Then the procedure proceeds to step S73, in which the collecting condition discriminator 1333 determines whether any index corresponding to the collecting condition received in step S71 is registered in its own device. Here, determination is performed in a similar method to that used in step S43, that is, by the collecting condition discriminator 1333 determining whether any index that includes the keyword character string received in step S71 is registered with referring to a table as shown in FIG. 16.

Next, the procedure proceeds to step S74 and if an index to be collected is retrieved in step 73, the procedure proceeds to step S75. In step 75, the index transmitter 1334 transfers the index retrieved in step S73 to a designated server. At this time, the index registered in its own device is kept therein and duplicate thereof is transmitted to the transfer destination document server, so that the index is duplicated. Ifs two or more indices are retrieved in step S73, duplicates of all the indices are transferred to the corresponding designated document server.

FIG. 23 is a flowchart describing the operation on the document server when the index is transferred from other document server.

In step S81, the index receiver 1335 receives the transferred index. The procedure proceeds to step S82, in which the index manager 1323 lets the index received in step S81 stored in the storage unit 1311. Then, a series of processes is terminated.

With the above processes, the indices of the documents that include frequently-used retrieval keywords are collected in the document server. For example, in a case that the indices stored in the document server 1201 are as shown in FIG. 16, the indices C and D are stored in the document server 1201 as a result of respectively being duplicated from the document servers 1203 and 1204.

Process to register a document is described next taking the document server 1201 as an example.

FIG. 24 is a flowchart describing the process to register a document on the document server. As described above, here the body of a document to be registered (and corresponding index) is input from an external apparatus (not shown) via the network interface 1310. The index corresponding to the body of the registered document may be extracted in the document server (step S31), as described in the first embodiment.

Firstly, in step S91, the body of the document registered in the document registration unit 1336 and the corresponding index are stored in the storage unit 1311. The procedure then proceeds to step S92, in which the collecting condition discriminator 1333 determines whether the index stored in step S91 falls under the collecting condition stored in the collecting condition storage unit 1332. If the index stored in step S91 falls under the collecting condition, the procedure proceeds to step S93. In step S93, the index transmitter 1334 transfers the index that falls under the collecting condition to the document server designated by the collecting condition. When the index falls under two or more collecting conditions, in step S93, the index is transferred to collection destination document servers designated by all of the collecting conditions.

An exemplary process to register a document is described below with reference to FIGS. 25A and 25B.

FIG. 25A is a diagram showing the index corresponding to a document to be registered. FIG. 25B shows collecting conditions stored in the collecting condition storage unit 1332 of the document server in which the document is registered (in this case the document server 1201). As shown in FIG. 25A, the registered document includes keywords such as "panda", and "elephant". In FIG. 25B, since the keywords are respectively collected in the document servers 1203 and 1204, the index is transferred to the document servers 1203 and 1204.

With the above processes, collecting process of indices can be performed for newly registered documents as well. While the document server that has received the index transferred in step S93 in FIG. 24 duplicates the index in its own device, such duplication is performed by the same process as that described in FIG. 23.

In this manner, the indices corresponding to keywords that are frequently designated as the retrieval condition are collected in advance in the document server which the user operates to perform retrieval. As a result, since retrieval involving referring to the collected indices can be performed in the device of the document server, fast retrieval becomes possible.

Embodiment 3

Next, a third embodiment of the present invention is described. In the second embodiment, indices that include frequently-used retrieval keywords are duplicated in advance in the document server that is likely to be operated for retrieval. In contrast, in the third embodiment, it is assumed that a document display apparatus, printing apparatus or the like is used as a document server, and the indices are duplicated in a certain document server based on the characteristics of the registered documents.

The retrieved document is supposed to be displayed or printed in the document server. In the third embodiment as well, similarly to the second embodiment, the user operates the document server to retrieve a target document. Retrieval is performed from the operated document server, and at the same time the document server transmits the retrieval condition to other document servers so as to request retrieval. If a desired document is registered in the document server that the user operates, fast retrieval is possible since the document is retrieved from its own device.

FIG. 26 is a conceptual diagram illustrating the document retrieving system according to the third embodiment of the present invention. In FIG. 26, it is assumed that each document server is an image display apparatus, for example. In addition, it is assumed that in terms of the capability as the image display apparatus of the document server, a document server capable of displaying color images and that capable of displaying monochrome images only are present.

In this document retrieving system, in a case that a color image and a monochrome image are registered as a document, the color image is assumed to be retrieved from the document server capable of color display and displayed. For this reason, by collecting (duplicating) the indices corresponding to color documents in advance in the document server capable of color display, it is possible to retrieve a color document from the collection destination document server capable of color display in a short time.

In FIG. 26, a document server 2601 is a document server capable of color display, and document servers 2602 to 2604 are document servers capable of monochrome display only. In FIG. 26, indices F and H corresponding to the color document are duplicated and stored in the document server 2601. That is, the indices corresponding to the color document are collected in the document server 2601. Accordingly, when a color document is retrieved from the document server 2601, it is possible to retrieve the color document in a short time since the color document is retrieved from its own device.

As described above, in the third embodiment, a collection destination document server for the index is determined depending on the characteristics of the document registered. In the third embodiment, a case is described in which the document server is an image display apparatus, but the document server is not limited to it. For example, when the document server is a printing apparatus, a configuration is possible in which indices corresponding to data made up of a large number of pages are duplicated on a document server capable of high-speed printing or a document server in which consumable articles remain in large volume. Also, a configuration is possible in which indices corresponding to graphic documents are duplicated in the document server with high print resolution.

FIG. 27 is a diagram illustrating a configuration of the document retrieving system according to the third embodiment. In addition to the configuration described in the second embodiment, a document attribute discriminator 2701 and a document server capability storage unit 2702 are added. Other than that the configuration is the same as that shown in FIG. 13. The document attribute discriminator 2701 determines whether a registered document is the color image or the monochrome image. The document server capability storage unit 2702 stores capability information of the display unit 1320 of each document server. Since operations of the third embodiment are the same as that described in the above second embodiment except for the process to register a document, description of the similar operations is omitted.

Figure 28:
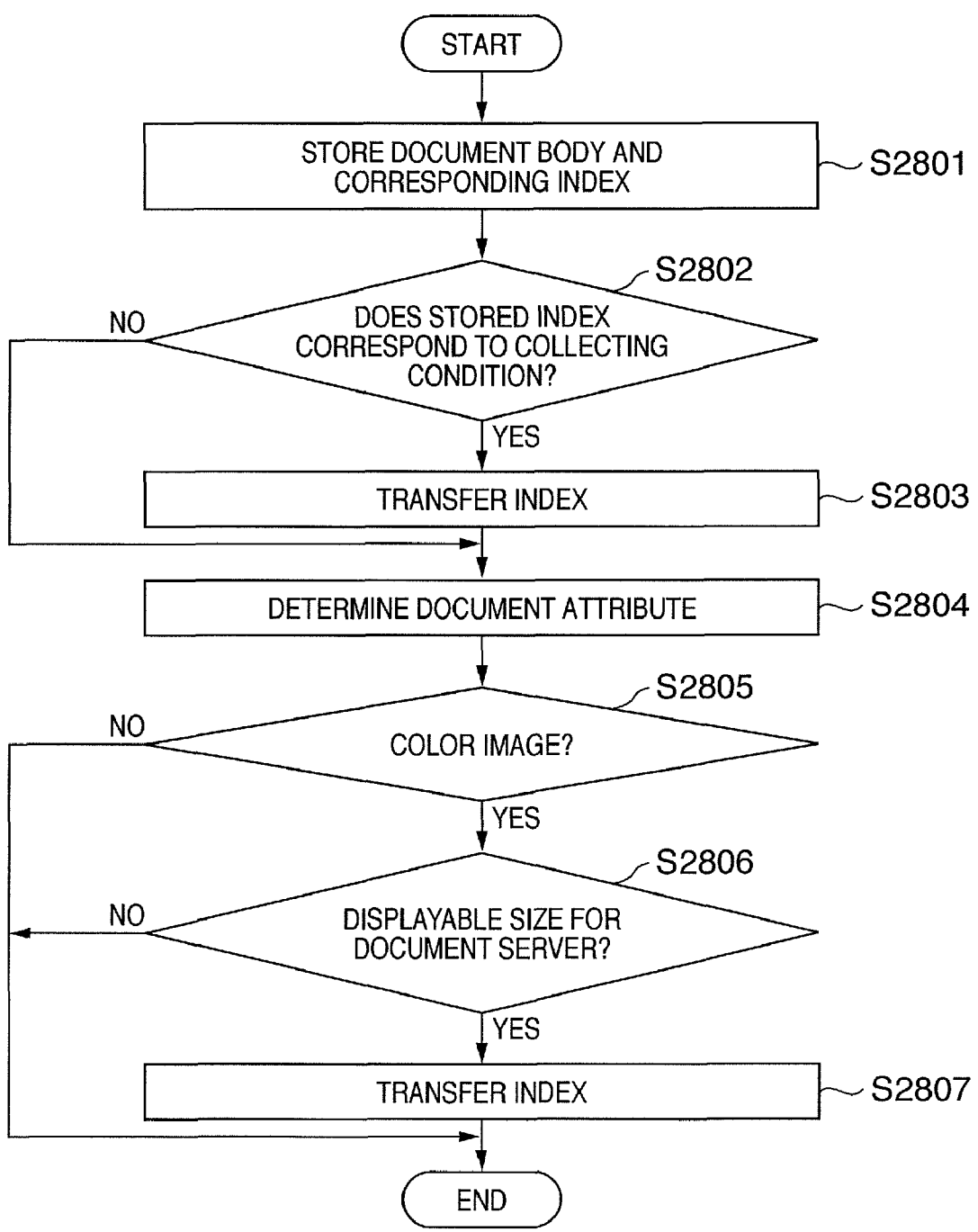
FIG. 28 is a flowchart describing a process to collect indices on the document server according to the embodiment of the present invention.

FIG. 28 is a flowchart describing the document registration process on the document server. Similarly to the second embodiment, the body of a document to be registered (and corresponding index) is input via a network interface 1310 from an external apparatus (not shown). The index corresponding to the body of the registered document may be extracted in the document server (step S31) as described in the first embodiment.

Firstly, in step S2801, the document registration unit 1336 stores the body of the input document and the corresponding index in the storage unit 1311. The procedure then proceeds to step S2802, in which the collecting condition discriminator 1333 determines whether the index stored in step S2801 falls under the collecting condition stored in the collecting condition storage unit 1332.

If the index stored in step S2801 falls under the collecting conditions, the procedure proceeds from step S2802 to step S2803, in which the index transmitter 1334 transfers the index that falls under the collecting conditions to the document server designated by the collecting conditions.

In a case that the index corresponds to two or more collecting conditions in step S2803, the index is transferred to all the collection destination document servers designated by the collecting conditions. The procedure then proceeds to step S2804, in which the document attribute discriminator 2701 determines the attribute of the registered document. In this case, the color type (color or monochrome) and the image size of the document are detected.

Then, the procedure proceeds to step S2805, in which it is determined whether the color type of the document determined in step S2804 is "color". If the color type is "color", the procedure proceeds to step S2806. In step S2806, by referring to the document server capability storage unit 2702, the document server that is capable of displaying the image of the size according to the attribute determined in step S2804 in color. If there is any document server capable of such display, the procedure proceeds to step S2807, in which the index transmitter 1334 transfers the index to the document server that is determined to be capable of the display in step S2806.

An example of document registration is described next with reference to FIGS. 29A and 29B.

FIG. 29A is a diagram showing an exemplary document attribute corresponding to the registered document. In FIG. 29A, the color type and the image size of the document are shown.

FIG. 29B is a diagram showing an exemplary table indicating the capability of each document server stored in the document server capability information storage unit 2702. In FIG. 29A, the color type (color) and the image size (1024× 768) of a document to be registered are obtained. Based on FIG. 29B, it is determined that the document server 2603, which is capable of displaying an image in a size larger than the image size (1024×768) in color, is appropriate to display the document. Accordingly, the index for the document is transmitted to the document server 2603. Here, although the document servers 2601 and 2604 are capable of color display, they are not chosen due to insufficient capability in terms of the image size.

With the above processes it is possible to duplicate (register) the index of a newly registered document in the document server that has a display unit that can display the document in color and in the size of the image.

In this manner, it is possible that the indices are collected in the document server expected to be operated for retrieval based on the characteristics of registered documents. As a result, fast retrieval becomes possible.

Other Embodiments

Although embodiments of the present invention were described in detail above, the present invention may be applied to a system comprising two or more devices as well as applied to an apparatus made up of a single device.

It should be noted that the present invention can be realized by supplying a software program implementing the functionality of the above-described embodiments to a system or an apparatus directly or remotely and allowing the computer of the system or apparatus to read and execute the supplied program. In such a case, the form of being a program is not essential to the present invention so long as the functions of the program are provided.

Therefore, the program code installed on the computer to implement the functional processing of the present invention on the computer itself implements the present invention. In other words, the computer program to implement the functional processing of the present invention itself is also included in the scope of the present invention. In such a case, so long as it has the functions of the program, it may take various forms, such as object code, interpreter-executed programs, script data supplied to the OS, etc.

Storage media used to supply the program may include, for instance, the following media. Namely, floppy (registered trademark) disks, hard disks, optical disks, magneto-optical disks, MOs, CD-ROMs, CD-Rs, CD-RWs, magnetic tape, non-volatile memory cards, ROM, DVDs (DVD-ROMs, DVD-Rs), etc.

Alternatively, the program can be supplied in the following method. Namely, the browser of a client computer is used to access an internet homepage to download the program from the homepage onto a storage media such as hard disks, etc. In such a case, the computer program of the present invention, or a compressed file possessing automatic installation functionality, may be downloaded. Moreover, the program can also be supplied by dividing the program code constituting the program of the present invention into two or more files and causing the respective files to be downloaded from different homepages. In other words, WWW servers that allow two or more users to download the program file used to implement the functional processing of the present invention on a computer are also included in the scope of the present invention.

In addition, the following embodiment is also contemplated for supply in which the program of the present invention is encrypted stored on a storage medium such as a CD-ROM, etc., and distributed among users. In such a case, users who satisfy certain criteria are allowed to download key information used for decryption from a homepage via the Internet, and by using this key information to cause the encrypted program to be installed on computers in an executable format.

Moreover, embodiments other than embodiments in which the functionality of the above-described embodiments is implemented by directing a computer to execute a program it reads are also possible. For example, an OS etc. running on a computer partially or entirely executes actual processing based on the instructions of the program and the functionality of the above-described embodiments can be implemented based on this processing.

Furthermore, a program read out from a storage medium may be written in memory provided in an expansion unit connected to the computer or an expansion board inserted into the computer. In such a case, after writing the program to the memory, a CPU, etc. provided in an expansion unit or expansion board partially or entirely executes actual processing based on the instructions of the program, and the functionality of the above-described embodiments is implemented based on this processing.

The embodiments of the present invention, as described above, can suppress increase in data volume of indices in the multi-server retrieving system by avoiding sharing of the indices by the servers.

In addition, when the indices, for example, frequently retrieved or frequently used are collected, and the keyword designated to collect indices corresponds to the indices, retrieval by that keyword is performed from the indices collected. Therefore, the retrieval efficiency improves.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2006-69902 filed Mar. 14, 2006 and No. 2007-032681 filed Feb. 13, 2007, which are hereby incorporated by reference herein in their entirety.

What is claimed is:

1. A document retrieving system for retrieving a document from documents registered in two or more document management servers which are connected via a network, the document retrieving system comprising:
a storage device, provided with each of the document management servers, configured to store a document and index data corresponding to the document; and
a controller programmed to:
obtain and collect the index data corresponding to one or more documents each satisfying a first retrieval condition from the storage device of each of the document management servers via the network, without retrieving the one or more documents each satisfying the first retrieval condition;
determine whether or not a second retrieval condition is the same as the first retrieval condition, the second retrieval condition being newly designated by a user; and
retrieve a document satisfying the second retrieval condition by:
transmitting a query, which includes the second retrieval condition, to all of the document management servers, in a case where the second retrieval condition is determined to be not the same as the first retrieval condition; and
transmitting the query to only one of the document management servers that stores the collected index data, without transmitting the query to any other document management server, in a case where the second retrieval condition is determined to be the same as the first retrieval condition;
manage log information of the second retrieval condition designated by the user; and
collect, in a case where, based on the log information, the second retrieval condition satisfying a predetermined collecting condition is determined to exist, the index data corresponding to the document satisfying the second retrieval condition.

2. A document retrieving system according to claim 1, wherein the controller is further programmed to:
manage collection information including information indicating the first retrieval condition and information indicating the document management server in which the collected index data is stored; and
access the document management server in which the collected index data is stored based on the collection information and retrieve the document, in a case where the second retrieval condition is determined to be the same as the first retrieval condition.

3. A document retrieving system according to claim 1, wherein the predetermined collecting condition is a condition in which a certain retrieval condition has been designated by a user at least a predetermined number of times.

4. A document retrieving system according to claim 1, wherein the controller is programmed to collect the index data corresponding to the one or more documents each satisfying the first retrieval condition to store the index data into a document management server which stores the most documents satisfying the first retrieval condition from among the document management servers.

5. A document retrieving system according to claim 1, wherein the controller is further programmed to:
register a new document and index data corresponding to the new document in one of the document management servers; and
resister the new document and the index data corresponding to the new document with the document management server which stores the collected index data, in a case where the new document satisfies the first retrieval condition.

6. A document retrieving apparatus for retrieving a document from documents registered in two or more document management servers which are connected to the document retrieving apparatus via a network, the document retrieving apparatus comprising:
an input device configured to receive a retrieval condition to retrieve a document;
a memory device configured to store log information of the retrieval condition received by the input device; and
a controller programmed to:
determine based on the log information stored in the memory device whether or not a retrieval condition designated by a user satisfying a predetermined collecting condition exists;

obtain and collect, in a case where, based on the log information stored in the memory device, the retrieval condition satisfying the predetermined collecting condition is determined to exist, index data corresponding to one or more documents each satisfying the retrieval condition from each of the document management servers via the network, without retrieving the one or more documents;

retrieve a document satisfying a newly designated retrieval condition by:
transmitting a query, which includes the newly designated retrieval condition, to all of the document management servers, in a case where the newly designated condition is not the same as the retrieval condition; and transmitting the query to only one of the document management servers that stores the collected index data, without transmitting the query to any other document management server, in a case where the newly designated retrieval condition is the same as the retrieval condition satisfying the predetermined collecting condition.

7. A document retrieving apparatus according to claim 6, wherein the predetermined collecting condition is a condition in which a certain retrieval condition is received by the input device at least a predetermined number of times.

8. A document retrieving apparatus according to claim 6, wherein the controller is further programmed to:
recognize an attribute of the document; and
collect in a case where the retrieval condition satisfying the predetermined collecting condition is determined to exist, the index data corresponding to the document selected based on the result of the recognition from among the documents satisfying the retrieval condition.

9. A document retrieving apparatus according to claim 8, wherein the controller is further programmed to:
manage capability information pertaining to a function of the document retrieving apparatus; and
collect, in a case where the retrieval condition satisfying the predetermined collecting condition is determined to exist, the index data corresponding to the document selected based on the result of the recognition and the capability information from among the documents satisfying the retrieval condition.

10. A document retrieving apparatus according to claim 9, further comprising:
at least a display device configured to display the document or a printer configured to print the document,
wherein the controller is programmed to manage at least the capability information pertaining to a function of the display device or a function of the printer.

11. A document retrieving method for a document retrieving system for retrieving a document from documents registered in two or more document management servers which are connected via a network, the method comprising the steps of:
storing a document and index data corresponding to the document in a storage device of each of the document management servers;
obtaining and collecting index data corresponding to one or more documents each satisfying a first retrieval condition from the storage device of each of the document management servers via the network, without retrieving the one or more documents each satisfying the first retrieval conditions;
determining whether or not a second retrieval condition is the same as the first retrieval condition, the second retrieval condition being newly designated by a user;
retrieving a document satisfying the second retrieval condition by:
transmitting a query, which includes the second retrieval condition, to all of the document management servers, in a case where the determining step determines that the second retrieval condition is not the same as the first retrieval condition; and
transmitting the query to only one of the document management servers that stores the index data collected in the collecting step, without transmitting the query to any other document management server, in a case where the determining step determines that the second retrieval condition is the same as the first retrieval condition;
managing log information of the second retrieval condition designated by the user; and
collecting, in a case where, based on the log information, the second retrieval condition satisfying a predetermined collecting condition is determined to exist, the index data corresponding to the document satisfying the second retrieval condition.

12. A document retrieving method for a document retrieving apparatus for retrieving a document from documents registered in two or more document management servers which are connected to the document retrieving apparatus via a network, the method comprising the steps of:
inputting a retrieval condition to retrieve a document,
storing log information of the retrieval condition input in the inputting step in a memory device,
determining whether or not a retrieval condition designated by a user satisfying a predetermined collecting condition exists, based on the log information stored in the memory device,
obtaining and collecting, in a case where, based on the log information stored in the memory device, the determining step determines that the retrieval condition satisfying the predetermined collecting condition exists, index data corresponding to the one or more documents each satisfying the retrieval condition from each of the document management servers via the network, without retrieving the one or more documents; and
retrieving a document satisfying a newly designated retrieval condition by:
transmitting a query, which includes the newly designated retrieval condition, to all of the document management servers, in a case where the newly designated condition is not the same as the retrieval condition; and
transmitting the query to only one of the document management servers that stores the index data collected in the collecting step, without transmitting the query to any other document management server, in a case where the newly designated retrieval condition is the same as the retrieval condition satisfying the predetermined collecting condition.

13. A non-transitory computer-readable storage medium storing a computer program executable by a document retrieving system for carrying out a method of retrieving a document from documents registered in two or more document management servers which are connected via a network, the method comprising the steps of:
storing a document and index data corresponding to the document in a storage device of each of the document management servers;
obtaining and collecting index data corresponding to one or more documents each satisfying a first retrieval condition from the storage device of each of the document management servers via the network, without retrieving the one or more documents each satisfying the first retrieval condition;

determining whether or not a second retrieval condition is the same as the first retrieval condition, the second retrieval condition being newly designated by a user; and retrieving a document satisfying the second retrieval condition by:
- transmitting a query, which includes the second retrieval condition, to all of the document management servers, in a case where the determining step determines that the second retrieval condition is not the same as the first retrieval condition; and
- transmitting the query to only one of the document management servers that stores the index data collected in the collecting step, without transmitting the query to any other document management server, in a case where the determining step determines that the second retrieval condition is the same as the first retrieval condition;

managing log information of the second retrieval condition designated by the user; and collecting, in a case where, based on the log information, the second retrieval condition satisfying a predetermined collecting condition is determined to exist, the index data corresponding to the document satisfying the second retrieval condition.

14. A non-transitory computer-readable storage medium storing a computer program executable by a document retrieving apparatus for retrieving a document from documents registered in two or more document management servers which are connected to the document retrieving apparatus via a network, the method comprising the steps of:

inputting a retrieval condition to retrieve a document;

storing log information of the retrieval condition input in the inputting step in a memory device;

determining whether or not a retrieval condition designated by a user satisfying a predetermined collecting condition exists, based on the log information stored in the memory device; and obtaining and collecting, in a case where, based on the log information stored in the memory device, the determining step determines that the retrieval condition satisfying the predetermined collecting condition exists, index data corresponding to one or more documents each satisfying the retrieval condition from each of the document management servers via the network, without retrieving the one or more documents; and retrieving a document satisfying a newly designated retrieval condition by:
- transmitting a query, which includes the newly designated retrieval condition, to all of the document management servers, in a case where the newly designated condition is not the same as the retrieval condition; and
- transmitting the query to only one of the document management servers that stores the index data collected in the collecting step, without transmitting the query to any other document management server, in a case where the newly designated retrieval condition is the same as the retrieval condition satisfying the predetermined collecting condition.

* * * * *